United States Patent
de Broqueville et al.

(10) Patent No.: US 8,257,657 B2
(45) Date of Patent: Sep. 4, 2012

(54) DEVICE AND METHOD FOR INJECTING FLUID INTO A ROTATING FLUIDIZED BED

(75) Inventors: Axel de Broqueville, Grez-Doiceau (BE); Juray De Wilde, Ghent (BE)

(73) Assignee: Total Petrochemicals Research Feluy, Seneffe (feluy) (BE)

(*) Notice: Subject to any disclaimer, the term of this patent is extended or adjusted under 35 U.S.C. 154(b) by 306 days.

(21) Appl. No.: 12/297,991

(22) PCT Filed: Apr. 23, 2007

(86) PCT No.: PCT/EP2007/053941
§ 371 (c)(1), (2), (4) Date: Mar. 24, 2010

(87) PCT Pub. No.: WO2007/122211
PCT Pub. Date: Nov. 1, 2007

(65) Prior Publication Data
US 2010/0197879 A1    Aug. 5, 2010

(30) Foreign Application Priority Data

Apr. 21, 2006 (EP) .................................. 06008351
Mar. 2, 2007 (EP) .................................. 07103440

(51) Int. Cl.
B01J 8/18   (2006.01)
F27B 15/08  (2006.01)
C08F 210/00 (2006.01)
B05D 7/00   (2006.01)

(52) U.S. Cl. ........ 422/140; 422/145; 422/139; 526/348; 427/213

(58) Field of Classification Search .................. 526/348; 422/140, 145, 139; 427/213
See application file for complete search history.

(56) References Cited

U.S. PATENT DOCUMENTS

| 3,276,627 A | 10/1966 | Birkestrand |
| 2007/0238839 A1 | 10/2007 | de Broqueville |
| 2008/0219903 A1 | 9/2008 | de Broqueville |
| 2008/0269432 A1 | 10/2008 | de Broqueville |
| 2009/0022632 A1 | 1/2009 | de Broqueville |
| 2009/0098263 A1 | 4/2009 | de Broqueville |

FOREIGN PATENT DOCUMENTS

| WO | WO 2005/099887 | * 10/2005 |
| WO | WO2008107404 | 9/2008 |

OTHER PUBLICATIONS

L.M. Kochetov, et al.; "Experimental Determination of the Optimal Ratios of Structural Dimensions in the Whirl Chamber for Drying Granular Materials"; Investigation and Calculation of Thermochemical Processes; Khimicheskoe i Neftyanoe Mashinostroenie, No. 2; pp. 106-108; Feb. 1969.

Loren A. Anderson, et al,; "Two-Component Vortex Flow Studies of the Colloid Core Nuclear Rocket"; J. Spacecraft; The British Library; vol. 9, No. 5; pp. 311-317; May 1972.

E.P. Volchkov, et al.; "Aerodynamics and Heat and Mass Transfer of Fluidized Particle Beds in Vortex Chambers"; Heat Transfer Engineering, vol. 14, No. 3; pp. 36-47; 1993.

* cited by examiner

*Primary Examiner* — William Cheung

(57) ABSTRACT

A device for discharging, through a central rotating chimney, fluids from a fluidized bed driven in a rotational movement in the same direction by the rotation of the outer circular wall of a reaction chamber and/or by injection of part of these fluids along the circular wall of a fixed or rotating chamber, and methods for catalytic polymerization, drying, or other treatments of solid particles in suspension in a rotating fluidized bed or for cracking or other catalytic conversions of fluids using this device.

19 Claims, 9 Drawing Sheets

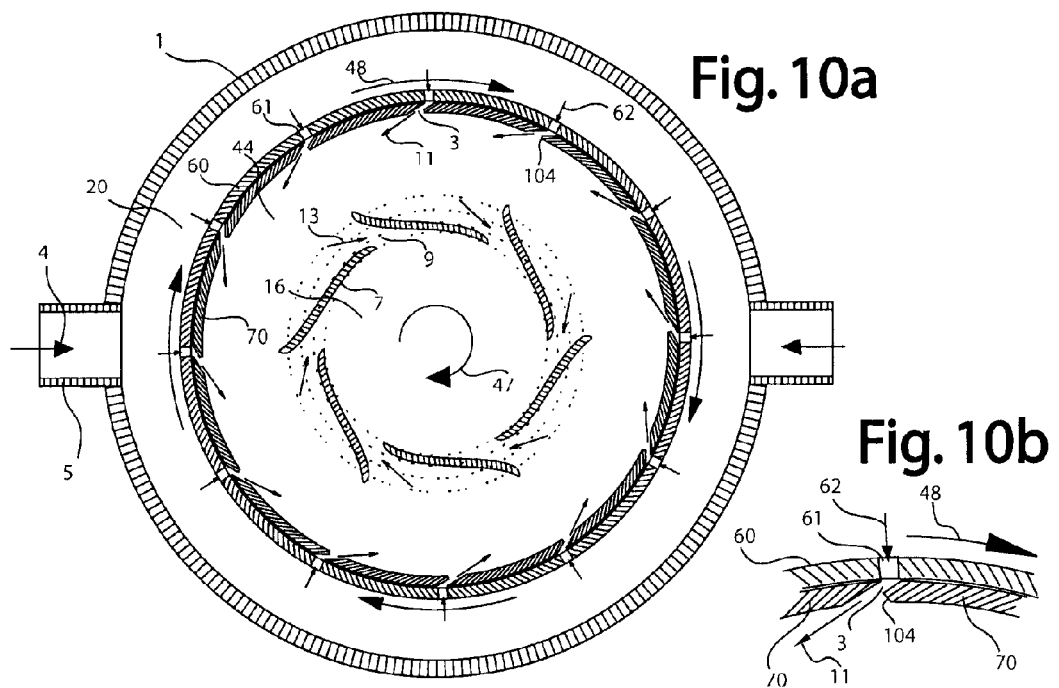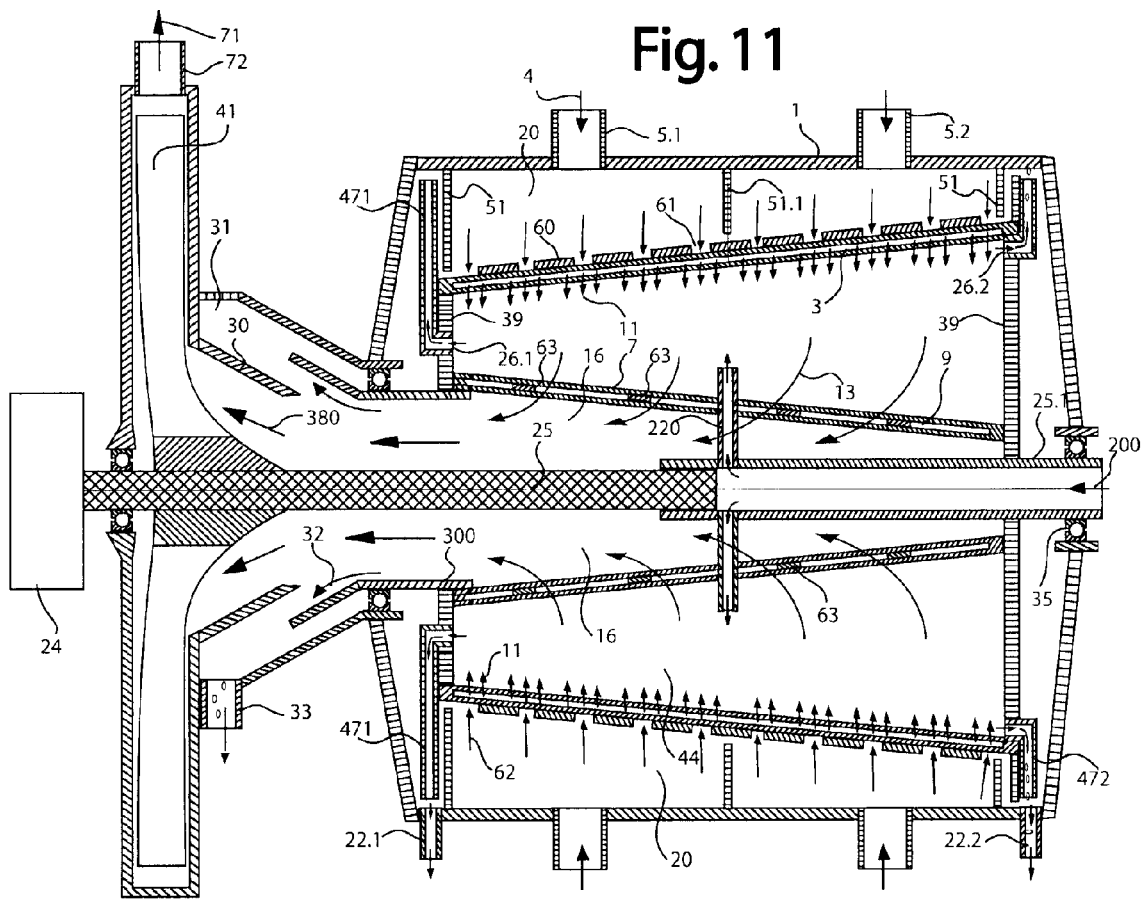

DEVICE AND METHOD FOR INJECTING FLUID INTO A ROTATING FLUIDIZED BED

TECHNICAL FIELD OF THE INVENTION

The present invention relates to a device with a rotating fluidized bed comprising a rotating device for discharging a fluid or fluids passing through the rotating fluidized bed. In particular, the present invention relates to a device for discharging, through a central rotating chimney, one or more gaseous or liquid fluids from a rotating or fixed reaction chamber along which the fluid or fluids is/are injected and cause a fluidized bed to rotate while passing through it. The present invention also relates to methods for catalytic polymerization, drying, impregnation, coating, combustion, gasification, classification or other treatments of solid particles suspended in a rotating fluidized bed, or cracking, dehydrogenation or other catalytic conversions of fluids using this device.

TECHNICAL BACKGROUND TO THE INVENTION

In order to obtain a dense fluidized bed, traversed by a fluid flow, the pressure exerted by the fluid on solid particles must be compensated for by an opposite force, that is gravity in conventional fluidized beds, and centrifugal force in rotating fluidized beds. If the particles are very small, for example powders of group C of the Geldart classification, or if the density of the fluid is close to that of the solid particles, for example when the fluid is a liquid, the centrifugal force must be very high and/or the fluid flow passing through the fluidized bed must be low.

It is easy to obtain a rotating fluidized bed by supporting it on a rotating porous cylinder, but non-uniformity of the fluidized bed may bring about strong vibrations limiting the speed of rotation of this device and it is not easy to feed in and discharge solid particles without their being entrained by the fluid, when the particles are very fine. It is also possible to obtain a rotating fluidized bed in a fixed circular chamber by injecting fluid in thin layers along the fixed circular wall and by discharging it through openings in a central chimney passing through the circular chamber. Such a device is described in international patent application WO-A-2005/099887 in the name of one of the inventors of the present application.

In this latter device, in order to increase the speed of rotation of solid particles, the fluid flow must be increased and/or the distance between the circular wall and the central chimney must be reduced and/or the cross section of the fluid injectors must be reduced so as to increase the speed of injection at a constant flow rate. In practice, friction of the fluid along the central chimney makes it difficult to obtain a very high centrifugal force close to the central chimney with too high a fluid flow rate, which may bring about entrainment of the finer solid particles in the central chimney.

SUMMARY OF THE INVENTION

The present invention comprises a device for feeding and discharging solid particles in a rotating or fixed circular reaction chamber and a device (also called an injection device) for feeding in one or more gaseous or liquid fluids, enabling all or part of the fluid or fluids to be injected along the fixed or rotating circular wall of the reaction chamber, in the form of fluid jets, preferably in directions forming an angle less than 45° with planes tangential to the circular wall, or in a succession of thin layers passing along the fixed circular wall so as to cause this fluid or these fluids that entrain solid particles to rotate along the fixed or rotating circular wall in a rotating movement of which the centrifugal force pushes them toward the fixed circular wall along which they form a rotating fluidized bed. It also includes a device for discharging this fluid or these fluids comprising a central rotating tube, also called a central rotating chimney or central discharge chamber, passing through or entering longitudinally inside the fixed or rotating circular reaction chamber, this central rotating tube having one or more openings enabling this fluid or these fluids to be discharged centrally, and rotating in the same direction and preferably more rapidly than the average speed of the fluid or fluids and of the rotating fluidized bed so as to increase the centrifugal force that pushes, toward the rotating or fixed circular wall, solid particles that are entrained by the fluid or fluids toward the central chimney.

In particular, the present invention relates to a rotating fluidized bed comprising:
 a device for feeding one or more gaseous or liquid fluids into a circular chamber, disposed around the outer circular wall of said circular chamber and a discharge device enabling the said fluid or fluids to be discharged centrally,
 a device for feeding solid particles into said circular chamber and a device for discharging said solid particles,
 said device for feeding said fluid or fluids comprises openings for injecting fluid passing through said outer circular wall enabling said fluid or fluids to be injected, characterized in that:
 said device for discharging said fluid or fluids comprises a rotating central tube passing through or entering longitudinally inside said circular chamber, said central rotating tube comprising one or more discharge openings passing through the wall of said central tube enabling said fluid or fluids to be discharged centrally from said circular chamber, through said central rotating tube.

Preferably, said device for feeding said fluid or fluids comprises fluid-injection openings passing through said outer circular wall enabling said fluid or fluids to be injected in a direction of which the main component is tangential to said circular wall.

According to a particular embodiment, the present invention relates to a rotating fluidized bed, comprising: a device for feeding one or more gaseous or liquid fluids into a circular chamber, disposed around the outer circular wall of said circular chamber and a discharge device making it possible to discharge said fluid or fluids centrally; a device for feeding solid particles into said circular chamber and a device for discharging said solid particles, characterized in that: said device for feeding said fluid or fluids comprises fluid-injection openings passing through said outer circular wall enabling said fluid or fluids to be injected in a direction of which the main component is tangential to said circular wall; said device for discharging said fluid or fluids comprises a central rotating tube passing through or entering longitudinally inside said circular chamber, said central rotating tube comprising one or more discharge openings passing through the wall of said central tube enabling said fluid or fluids to be discharged centrally from said circular chamber, through said rotating central tube.

The rotating central tube may be equipped with outer vanes or fins enabling the speed of rotation of a layer of fluid that surrounds it to be accelerated, which preferably has a diameter less than that of the fluidized bed and that does not contain solid particles or only contains few of these, which enables a very high rotational speed to be obtained and therefore very high centrifugal forces to be produced on the finer solid particles entrained by the fluid or fluids close to this rotating central tube, that are preferably greater than the average centripetal force exerted by this fluid or these fluids on the solid particles and in this way to repel them toward the rotating fluidized bed. This makes it possible to obtain rotating fluidized beds composed of or containing very fine particles and traversed by a large quantity of fluids.

According to a particular embodiment, said discharge openings passing through said wall of said central rotating tube are oriented radially or in the same direction as said central rotating tube.

According to a particular embodiment, the outer circular wall of said circular chamber is fixed. According to another particular embodiment, the outer circular wall of said circular chamber is rotating. Preferably, the outer circular wall of said circular chamber may rotate in the same direction and at a speed of rotation less than the speed of rotation of said rotating central tube. The circular reaction chamber (or annular chamber) may thus be fixed, which means that its circular wall (or outer circular wall) is fixed or may be rotating, which means that its outer circular wall is rotating, and is connected to a motor that can cause it to rotate.

According to a particular embodiment, the fluid-injection openings passing through said rotating outer wall are oriented in the same direction as the direction of rotation of said rotating central tube.

According to another particular embodiment, the fluid-injection opening or openings passing through said outer circular wall is/are oriented in a direction opposite to the direction of rotation of the outer circular wall and of the rotating central tube. According to a particular embodiment, the discharge opening or openings passing through said wall of central rotating tube is/are oriented in the direction of or radially to the direction of rotation of the outer circular wall and of the wall of said central tube.

According to another particular embodiment, the outer circular wall of said circular chamber is fixed to said central rotating tube, in this way delimiting a rotating annular chamber. Preferably, in this case, the fluid-injection openings passing through said outer circular wall are oriented in a direction opposite to the direction of rotation of the outer circular wall and of the rotating central tube.

In the present invention, the cross sections of the rotating or fixed circular chamber may be circles, ellipses, polygons or other variable curved shapes so as to vary the centrifugal force on the solid particles that rotate along this surface, and the surface of these cross sections may be constant or vary progressively or in steps so as to vary the thickness of the fluidized bed. The circular chamber may have a cylindrical, polygonal or conical shape or other variable forms of curvature. According to a particular embodiment, the inner surface of said outer circular wall is polygonal.

According to whether the fluid is injected in the form of thin films or fluid jets, if its injection speed is very high, when the solid particles that pass along the circular wall come into contact with the fluid, they are suddenly separated from the wall, so as then to approach it again under the effect of centrifugal force. The solid particles may thus be subjected to pressure variations and rapid and intense vibrations. This property is particularly valuable when it is necessary to prevent the agglomeration of microparticles under the effect of cohesive forces, and for sticky solid particles such as elastomers or bituminous solids. Rapid pressure variations also make it possible to improve mass transfer between the fluid and porous solid particles.

According to a particular embodiment as described above, the present invention also relates to a device for feeding and discharging solid particles in a rotating circular reaction chamber and a device for injecting one or more gaseous or liquid fluids, making it possible to inject all or part of the fluid or fluids along the rotating circular wall of the reaction chamber in a direction opposite to the direction of rotation so as to cause the bed of solid particles to rotate in a contrary direction and thus to reduce the centrifugal force there in order to be able to fluidize there the coarser solid particles without having to increase the fluid flow rate with the risk of entraining the smaller particles in the device for discharging fluid.

In the present invention, the device may also include a fixed feed chamber inside which said circular chamber is located. According to a particular embodiment, the device may also include a fixed chamber for feeding in one or more fluids, of which the outer envelope is fixed and inside which said fixed or rotating annular chamber is located containing solid particles, delimited by two concentric cylindrical or circular walls connected together by two lateral sides. According to a particular embodiment, the device may also include a fixed feed chamber of which the outer end of the envelope is fixed and inside which a rotating annular chamber rotates rapidly about its axis of symmetry, this being delimited by two concentric cylindrical or circular walls, connected together by two lateral sides.

According to a particular embodiment, the outer circular wall is provided with fluid-injection openings, regularly distributed along its surface, enabling the fluid or fluids to be fed into the annular chamber and the inner circular wall (rotating central tube) is provided with discharge openings enabling the fluid or fluids to be discharged toward the central discharge chamber, which is the rotating space inside the inner circular wall and that is connected to one or more fixed discharge tubes, connected to a device for discharging the fluid or fluids.

According to a particular embodiment, the fluid or fluids coming from the feed chamber and passing through the outer circular wall is/are injected in a direction contrary to the rotational movement so as to cause solid particles that accumulate along this wall under the effect of centrifugal force to rotate in a counter direction and therefore to reduce the centrifugal force there in order to facilitate fluidization of these solid particles, generally the coarser or heavier particles, without reducing the centrifugal force that is exerted on the solid particles, generally those that are finer or lighter, that are entrained close to the inner circular wall under the effect of the centripetal pressure of the fluid or fluids passing through the bed of fluidized solid particles.

According to a particular embodiment, in order to obtain fluid flows that are regularly distributed in successive layers all along the outer circular wall, the fluid-injection openings may have the form of longitudinal slits, which are sufficiently fine so that the speed of injection of the fluid or fluids is at least half the speed of rotation of the outer circular wall and preferably at least equal to this speed. Said fluid-injection openings comprise longitudinal slits and are preferably spaced by distances less than double the average distance between the outer circular wall and said wall of said central tube. In order to avoid large undesirable differences in the flow of fluids between various portions of the outer circular wall, the pressure drop of fluids through these fluid-injection openings is preferably greater than one fifth of the average centrifugal pressure of solid particles on the outer circular wall and this pressure drop is preferably obtained by means of constrictions followed by a non-aerodynamic expansion of the fluid or fluids generating turbulence and therefore a pressure drop approximately proportional to the square of the flow of the fluid or fluids. This sudden expansion of the fluid or fluids is preferably directed in a longitudinal and/or radial direction and preferably at a short distance, preferably of the same order of magnitude as the width of the opening for injecting the fluid or fluids, before they encounter solid particles, so as to improve fluidization and therefore homogeneity of the fluidized bed.

According to a particular embodiment, the openings passing through the wall of the rotating central tube for discharging the fluid or fluids in the central discharge chamber are preferably directed in the direction of rotation of the circular walls so that the fluid or fluids passes/pass though these openings with a tangential speed that is added to the rotational speed of this wall, which increases the centrifugal force on the solid particles entrained by the fluid and thus reduces the probability of their being entrained in the rotating chamber for discharging fluid. In order to avoid undesirable differences in the flow of fluids discharged through openings distributed along the circular surface, these openings may also include constrictions followed by sudden non-aerodynamic expansion, so as to generate turbulence and a pressure drop approximately proportional to the square of these flows.

According to this particular embodiment, the discharge openings of the inner circular wall may be delimited by blades that may be flat or curved. The angle formed by the tangent to an edge of the cross section of a blade at a given point and by the tangent to the circumference passing through this point and of which the center is the axis of rotation, is called without distinction hereinafter the inclination or angle of incidence at this point of the surface of this blade. This inclination generally varies along the surface of the blades. According to a particular embodiment, said discharge opening or openings is/are delimited by one or more hollow blades that can be fed with fluids through a central tube that can serve as a transmission shaft. According to a particular embodiment, said discharge opening or openings is/are delimited by one or more blades of which the inner surface of their outer ends has an inclination or angle of incidence greater than 45°. According to a particular embodiment, said discharge opening or openings is/are delimited by one or more blades of which the outer surface of their inner ends has an inclination or angle of incidence greater than 45°. According to a particular embodiment, said discharge opening or openings is/are delimited by one or more blades of which the outer surface of their middle part has an inclination or angle of incidence less than 30°. The solid particles slide along the surface of the blades when the inclination is low and they are repelled toward the outer circular surface when the inclination is high and the speed of rotation generates a centrifugal force greater than the centripetal pressure of the fluid. In a particular embodiment promoting separation of the fluidized bed into two concentric zones, an outer zone where the coarser (or heavier) particles are concentrated along the outer circular wall and an inner zone, around the blades forming the inner circular wall, where the finer (or lighter) particles are concentrated, the blades have a high inclination, preferably greater than 45°, along the outer part of the blades and a relatively low inclination, preferable less than 30°, along this middle part, so as, first of all, to slow rotation in a counter-direction of solid particles that approach the inner circular surface, and then to accelerate them by the force of drawing off the fluid in the direction of rotation of the annular chamber so as to increase the centrifugal force and to prevent these particles from entering the central discharge chamber. In order to prevent vortices that are generated by variations in the tangential speeds of solid particles along the blades from generating instability of the fluidized bed, the distance between the outer end of a blade and the following blade is preferably less than the distance that separates this outer end from the outer circular surface.

In the present invention, said inner circular wall may have hollow blades that can be fed with fluid through a central tube or transmission shaft driving said rotating circular wall, said fluid being injected inside the central rotating discharge chamber, preferably in the direction of rotation, through openings in said hollow blades. According to a particular embodiment, said hollow blades may have openings enabling said fluid or fluids to be injected in the direction of rotation in said central rotating tube.

In the present invention, the central rotating discharge chamber may be extended beyond the circular chamber by at least one rotating tube, preferably flared, capable of rotating inside a separating chamber acting as a cyclone, this in order to concentrate along its inner wall solid particles entrained by the fluid and to separate them from the fluid, in a separation chamber or cyclone, before the fluid is discharged through the fixed discharge tube.

In the present invention, the solid particles may be fed into the rotating annular chamber through its inner circular wall through one or more tubes passing through the central chamber for discharging fluid.

In the present invention, the solid particles may be discharged through the feed chamber through one or more openings in the outer circular wall or the sides of the annular chamber. These openings are preferably connected to tubes that rotate with the outer circular wall making it possible, by virtue of the centrifugal force, to discharge solid particles in an isolated portion of the fluid feed chamber, said portion, called the discharge zone, being preferably maintained at a pressure less than the pressure of the feed chamber so as to prevent the transfer of solid particles to the feed chamber.

In the present invention, the position of the outlet openings for solid particles may enable the thickness of the fluidized bed or the average concentration of solid particles in the rotating annular chamber to be controlled, as well as the type of particles discharged, the coarser particles generally accumulating along the outer circular wall and the finer particles close to the inner circular wall.

In the present invention, the rotating annular chamber may be divided into several annular sections traversed by fluids with different compositions and/or at different temperatures, said fluids being fed in and discharged separately.

The device according to the present invention, comprising a central rotating tube in a rotating or fixed reaction chamber that can optionally, when the reaction chamber is rotating, comprise a device for injecting fluid in a direction contrary to the direction of rotation of the rotating reactor supporting a rotating fluidized bed, is particularly suited to methods with a fluidized bed comprising mixtures of solid particles of which the dimensions and/or specific gravities have a wide distribution, making it difficult to fluidize them. It is therefore advantageous to classify mixtures of solid particles with substantially different sizes or specific gravities.

According to a particular embodiment, said device with a rotating fluidized bed includes a device for discharging solid particles passing through one or more tubes traversing a said lateral wall or said outer circular wall. This discharge device discharges said solid particles with the aid of the centrifugal force into a discharge zone separated from a fixed feed chamber by a separating device. According to a particular embodiment, the inlet to at least one of said tubes is at a distance from said inner circular wall less than half the average distance between said outer and inner circular wall. According to a particular embodiment, the inlet to at least one of said tubes is at a distance from said outer circular wall less than half the average distance between said outer circular wall and the wall of said rotating central tube.

The device according to the present invention is particularly suitable for methods where solid particles undergo high attrition, such as combustion or gasification of biomasses or other carbonaceous particles and for methods where solid particles substantially increase in size, such as polymerization with catalytic particles and the coating of microparticles.

Since the quantity of gas passing through the fluidized bed may be of several orders of magnitude greater than the quantity of gas passing through non-rotating fluidized beds, with extremely short dwell times, this device is particularly suitable equally for methods involving very high reaction rates as well as for reactions outside equilibrium.

Since the fluidized bed may be traversed by fluids at temperatures and/or compositions that are different or that vary progressively, this device is also suitable for copolymerization with catalytic particles or for the coating and progressive drying of powders or grain with a wide particle size distribution.

The present invention also relates to a method for catalytic polymerization, combustion, gasification, classification, impregnation, coating, drying or other treatments of solid particles in suspension or the catalytic conversion of fluids in a device with a rotating fluidized bed according to the present invention, characterized in that it comprises steps that consist of: injecting one or more fluids into a rotating or fixed circular chamber containing said solid particles through said fluid-injection openings of the outer circular wall, and of discharging said fluid or fluids centrally from said circular chamber into a central rotating tube through one or more discharge openings.

According to a particular embodiment, the method comprises the injection of fluid or fluids into the rotating or fixed circular chamber through said injection openings in a direction and at a speed of which the main component is opposite, or at least equal to, half the speed of rotation of said central rotating tube and the discharge of said fluid or fluids centrally from said circular chamber through said discharge openings in a direction of which the main component is in the direction of, or radial to, the direction of rotation of said central rotating tube.

According to a particular embodiment, said fluid or fluids undergoes/undergo sudden expansion, with generation of turbulence in a longitudinal direction and/or a sudden expansion with generation of turbulence, in a radial direction inside the fluid-injection openings before coming into contact with said solid particles circulating inside said circular chamber.

According to a particular embodiment, the average pressure drop of said fluid or fluids passing through said outer circular wall through said fluid-injection openings is at least equal to a fifth of the average centrifugal pressure of said solid particles on said outer circular wall.

According to a particular embodiment, the method is characterized in that said device with a rotating fluidized bed includes a device for discharging solid particles passing through one or more tubes passing through said lateral wall or said outer circular wall and that unloads said solid particles with the aid of centrifugal force into a discharge zone separated from a fixed feed chamber by a separating device.

According to a particular embodiment, the method is characterized in that it includes a step that consists of recycling said fluid or fluids. According to a particular embodiment, the method is characterized in that it includes a step that consists of recycling said solid particles.

According to a particular embodiment, the method includes steps that consist of spraying a liquid in fine droplets onto said solid particles and of chemically reacting said liquid impregnating or surrounding said particles with said gaseous fluid or fluids passing through said rotating fluidized bed.

The present invention also relates to the use of a device according to the present invention in a polymerization method. Preferably, one of said fluids contains alpha-olefins. The present invention also relates to the use of a device according to the present invention in a gasification method. The present invention also relates to the use of a device according to the present invention in a method for the combustion of biomasses or other carbonaceous solid particles. The present invention also relates to the use of a device according to the present invention in a method for the catalytic conversion of a fluid or mixture of fluids passing through a rotating fluidized bed of which the solid particles are catalysts. According to a particular embodiment, said fluid or mixture of fluids contains olefins and said catalytic conversion involves changing the distribution of the molecular weights of said olefins. According to another particular embodiment, said fluid or mixture of fluids contains/contain ethylbenzene and said catalytic conversion involves its dehydrogenation in order to convert it into styrene. Preferably, said solid particles contain components that can react with hydrogen coming from said dehydrogenation, so as to reduce the concentration in said fluid or mixture of fluids, these said components being able to be regenerated outside said rotating annular chamber. The present invention also relates to the use of a device according to the present invention in a method for drying or extracting volatile components from said solid particles. A device according the present invention may also be used in a method for impregnating or coating said solid particles. Preferably, said solid particles are grain, powder or other fragments of organic origin.

Other features and advantages of devices and methods according to the present invention are described below in a non-limiting manner.

BRIEF DESCRIPTION OF THE DRAWINGS

FIG. 1b shows the longitudinal section of the example of FIG. 1a.

FIG. 9b shows a schematic axonometric perspective of the example of FIG. 9a.

FIG. 10a shows a schematic cross section of another example of an annular chamber, according to a particular embodiment of the present invention.

FIG. 10b shows an enlargement of the schematic section of an example of a slit for injecting fluid, according to a particular embodiment of the present invention.

FIG. 11 shows the schematic longitudinal section of an example of a conical annular chamber, according to a particular embodiment of the present invention.

DETAILED DESCRIPTION

Figure 1A:
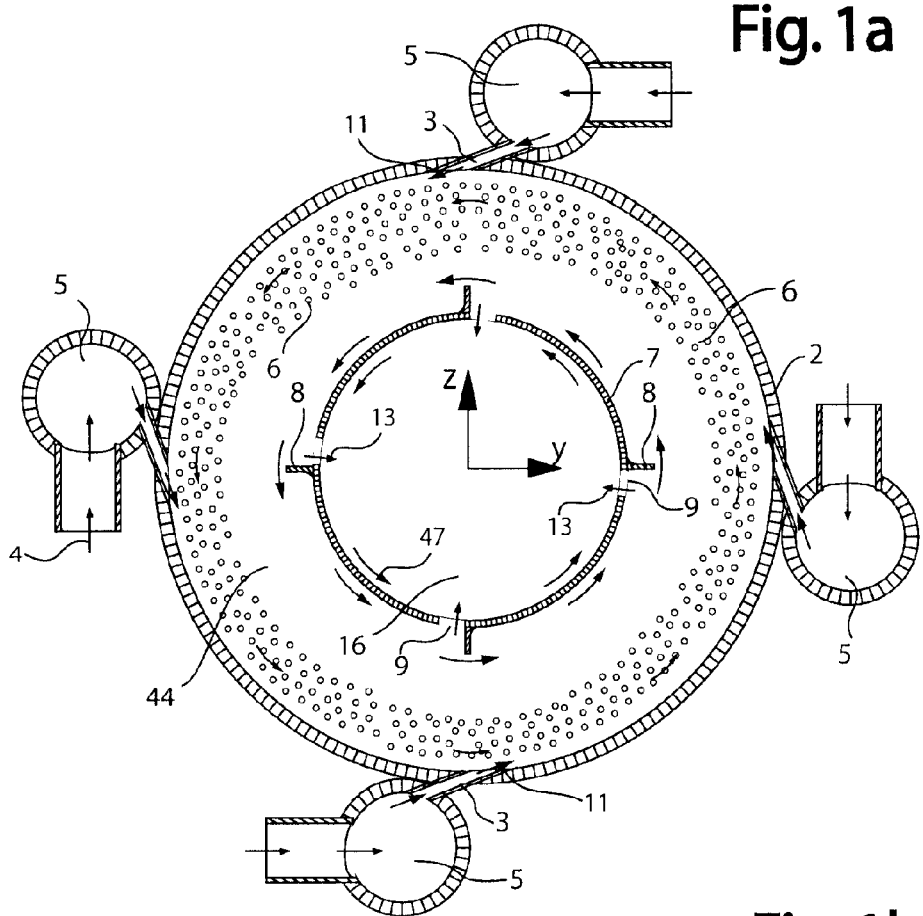
FIG. 1a shows a schematic cross section of an example of a circular chamber having a fixed circular wall traversed by fluid injectors, said circular chamber comprising a central rotating chimney, according to a particular embodiment of the present invention.

According to a particular embodiment of the invention, the device with a rotating fluidized bed comprises:
 a device for feeding into a fixed circular chamber one or more gaseous or liquid fluids, disposed about the fixed circular wall of said circular chamber and a device for allowing said fluid or fluids to be discharged centrally,
 a device for feeding solid particles into said circular chamber and a device for discharging said solid particles,
 said device for feeding said fluid or fluids comprising openings distributed along said fixed circular wall (or fluid injectors distributed about said fixed circular wall) allowing said fluid or fluids to be injected in directions preferably forming an angle less than 45° with planes tangential to said fixed circular wall, said fluid or fluids being able to rotate inside said circular chamber along said circular wall before being able to be discharged centrally and that can cause solid particles fed in by said feed device to rotate, characterized in that:
 said device for discharging said fluid or fluids comprises a central rotating tube (also called a central chimney) passing through or entering longitudinally inside said circular chamber, said central rotating tube being able to rotate in the same direction and comprising at least one discharge opening making it possible to discharge centrally the fluid or fluids from said circular chamber, through said central rotating tube.

According to another particular embodiment of the invention, the device with a rotating fluidized bed comprises:
 a device for feeding into a rotating circular chamber one or more gaseous or liquid fluids, disposed about the rotating circular wall of said circular chamber and a device for discharging said fluid or fluids centrally,
 a device for feeding solid particles into said rotating circular chamber and a device for discharging said solid particles,
 said device for feeding said fluid or fluids having openings distributed along said rotating circular wall (or fluid injectors, distributed about said rotating circular wall) enabling said fluid or fluids to be injected in directions preferably forming an angle less than 45° with planes tangential to said rotating circular wall, said fluid or fluids being able to rotate inside said rotating circular chamber along said circular wall before being able to be discharged centrally and that can cause said solid particles fed by said feed device to rotate, characterized in that:
 said device for discharging said fluid or fluids comprises a central rotating tube (also called a central chimney) traversing or entering longitudinally inside said circular rotating chamber, said central rotating tube being able to rotate in the same direction and comprising at least one discharge opening enabling said fluid or fluids to be discharged centrally from said rotating circular chamber, through said rotating central tube.

According to another particular embodiment of the invention, the device with a rotating fluidized bed comprises:
 a fixed feed chamber inside which an annular chamber (or circular chamber) is located that is capable of rotating about its axis of symmetry that can contain solid particles and is delimited by lateral walls, an outer circular wall provided with openings for injecting fluid regularly distributed along its surface and an inner circular wall, provided with discharge openings;
 a central discharge chamber surrounded by said inner circular wall;
 a device for feeding one or more fluids into said fixed feed chamber;
 a device for discharging said fluid or fluids that can discharge said fluid or fluids from said central discharge chamber,
characterized in that:
 the fluid injection openings passing through said outer circular wall for feeding said annular chamber with said fluid or fluids are oriented in the opposite direction to the direction of rotation of the inner and outer circular walls and
 the discharge openings passing through said inner circular wall for discharging the fluid or fluids into the discharge chamber are oriented in the direction of, or radially to, the direction of rotation of the inner and outer circular walls.

The term "fluid injector" refers to an opening through the circular wall of the circular chamber through which a fluid may enter inside said circular chamber. This passage or injection opening may have any form, for example a cylindrical tube or a tube with a polygonal cross section. It preferably has a form elongated in the longitudinal direction (perpendicular to the plane of rotation). In this case it is referred to as an "injection slit". The term "injectors", "injection opening" or "injection slit" are used in some embodiments of the invention as synonyms.

The terms "circular reaction chamber" or "reaction chamber" are used in some embodiments of the present invention as synonyms and refer to a chamber inside the reactor delimited by two circular walls and lateral sides. According to a particular embodiment, the diameter of the outer circular wall in the middle of said circular chamber is greater or smaller than the outer diameter of one of its sides. According to a particular embodiment, the diameter of the inner circular wall of said circular chamber is the maximum of the side or sides through which said fluid or fluids may be discharged from said rotating central tube. According to a particular embodiment, the area of the cross section in the middle of said circular chamber is greater or smaller than the cross surface area of one of its sides.

According to a particular embodiment, the internal diameter of said central rotating tube is the maximum of the side or sides through which said fluid or fluids may be discharged from said rotating central tube. According to a particular embodiment, said circular chamber is divided into at least two annular zones separated by partitions provided with openings through which said solid particles may pass.

The inner circular wall delimits an inner rotating circular chamber, called here a central rotating tube, for discharging said fluid or fluids. The terms "central rotating tube", "fluid-discharge chamber" or "central chimney" are used in some embodiments of the present invention as synonyms.

According to a particular feature of the present device, at least part of said fluid injectors inject said fluid or fluids in a succession of layers that extend along said circular wall while rotating round said central rotating tube.

According to a particular embodiment, said central rotating tube rotates at a rotation speed greater than the average speed of rotation of said fluid or fluids.

According to a particular embodiment, said central rotating tube has hollow blades supplied with fluid through a central tube or transmission shaft driving said central rotating tube, said fluid being injected inside the rotating discharge chamber, preferably in the direction of rotation, through openings in said hollow blades.

According to a particular embodiment, said central rotating chimney has a cross section chosen from a circle, polygons and other variable curved forms. According to the present invention, said central rotating tube may also have vanes, blades or fins enabling the layer of fluid to be entrained in a rotating movement about said central rotating tube. The speed of rotation of said fluid layer may produce a centrifugal force greater than the average centripetal force exerted by said fluid or fluids on said solid particles, entrained by said fluid or fluids and entering inside said fluid layer. According to a particular embodiment, said central rotating tube is divided into at least two zones connected by separate devices for discharging fluids.

According to a particular embodiment, the fluid leaving said rotating central tube while rotating rapidly on itself enters a flared tube enabling said fluid to be separated from the solid particles entrained by said fluid inside said central rotating tube.

According to a particular embodiment, the device according to the present invention has a fixed feed chamber inside which said circular chamber is located. Said fixed feed chamber may be divided into at least two annular zones that may be fed with fluid separately.

The device according to the present invention may also include a device for recycling at least part of said fluid or fluids discharged by said device for discharging said fluid or fluids toward said device for feeding said fluid or fluids. According to a particular embodiment, said device for discharging said fluids makes it possible to discharge said fluids separately coming from successive annular sections of said circular chamber and said device for recycling said fluids enables said fluids that are discharged separately to be treated and fed separately in the other said successive annular sections.

According to a particular embodiment, the device according to the present invention is characterized in that said device for discharging said fluids having said central rotating tube provided with said vanes, blades or fins, also includes at least one fixed concentric tube outside said rotating tube, passing through at least one said annular section of said circular chamber and provided with at least one opening enabling said fluid or fluids coming from said annular section to be discharged centrally and separately, said vanes or fins fixed to said central rotating tube being extended so as to be able to rotate around and outside at least part of said fixed tube, in this way enabling the layer of fluids surrounding said fixed tube to rotate.

The device according to the present invention may also include at least one annular disc (49) fixed onto said central rotating tube or to said vanes, blades or fins, making it possible to separate said fluids that pass through said rotating fluidized bed and enter from either side of the annular disc in said central rotating tube or said concentric fixed tube.

The device according to the present invention may also include at least one separating disc (29) or annular disc (38.1) dividing said central rotating tube into separate sections enabling said fluids passing through the various sections of said rotating fluidized bed to be discharged separately.

According to another particular embodiment, the device according to the present invention may also include at least one helical coil fixed onto said rotating central tube or to said vanes, blades, or fins, and that can enter the fluidized bed. This makes it possible to move solid particles longitudinally that are close to the surface of the fluidized bed.

According to a particular embodiment, the device according to the present invention includes at least one turbine or compressor connected to said central rotating tube by a transmission shaft passing through said central rotating tube and through which at least part of the discharged fluid or fluids passes.

Said device for discharging said fluid or fluids may also include at least one turbine wheel or a rotating compressor of which the axis of rotation is the same as the axis of rotation of said central rotating tube and that is actuated by the same device causing said central rotating tube to rotate.

According to a particular embodiment, the average speed of rotation of said rotating fluidized bed generate a centrifugal force at least ten times gravity.

According to a particular embodiment, said device for feeding said fluid or fluids has fluid injectors making it possible to inject fluid jets capable of breaking the aggregation of sticky solid particles or those subjected to cohesive forces, and of preventing them from adhering to the walls of said circular chamber.

According to a particular embodiment, said device for feeding said solid particles makes it possible to inject said solid particles at a speed greater than the average speed of said solid particles in said rotating fluidized bed.

According to a particular embodiment, said device for feeding said solid particles injects said solid particles from one side of said circular chamber and said device for discharging said solid particles discharges the solid particles at the other end of said circular chamber the other side of said circular chamber, or said device for feeding said solid particles injects said solid particles into the central part of said circular chamber and said device for discharging said solid particles discharges the solid particles at both ends of said circular chamber or said device for feeding said solid particles injects said solid particles at both ends of said circular chamber and said device for discharging said solid particles discharges said particles at the center of said circular chamber.

According to a particular embodiment, the device according to the present invention may also include at least one regulating ring fixed along said circular wall close to a device for discharging said solid particles and before the latter, in the direction of circulation of said solid particles, the internal diameter of said regulating ring being greater than the diameter of the desired area of the fluidized bed. According to a particular embodiment, said device for discharging said solid particles includes an opening passing through from one side of said circular chamber at a distance from said circular wall equal to or less than the desired thickness of the fluidized bed. According to a particular embodiment, said device for discharging said solid particles includes a tube having an opening in said circular wall or against said circular wall.

According to a particular embodiment of the invention, the device with a rotating fluidized bed has at least one element enabling said solid particles to be moved longitudinally, chosen from deflectors or coils or fractions of helical coils fixed along said circular wall or said central rotating tube and the fluid injection openings enable a fluid to be injected in a direction having a longitudinal component. According to a particular embodiment, the axis of rotation of said fluidized bed and of said central rotating tube forms an angle less than 45' with the vertical and it includes an assembly of separating rings or helical coils that are fixed along said circular wall and of which the external diameter is greater than the desired diameter of said rotating fluidized bed. According to a particular embodiment of the invention, the axis of rotation of said fluidized bed and said central rotating tube form an angle less than 45° with the vertical and it includes an assembly of helical coils that are fixed along said central rotating tube and of which the external diameter is greater than the desired diameter of said rotating fluidized bed. According to a particular embodiment, said separating rings or said helical coils are hollow and are fed with fluid by said fluid feed device, said fluid being injected in the direction of rotation of said rotating fluidized bed. According to a particular embodiment, said regulating or separating ring or rings or said helical coils include at least one passage situated against said circular wall enabling said solid particles situated on one side of said separating rings to pass to the other side without having to pass through the space situated between the inner edges and said central rotating tube.

According to a particular embodiment of the invention, the device with a rotating fluidized bed includes a device for recycling said solid particles. According to a particular embodiment, the device includes at least two said successive circular chambers, said solid particles discharged from one of said successive circular chambers being fed into the following one.

According to a particular embodiment of the invention, said fluid or fluids are gases and it includes a device for injecting a liquid enabling said liquid to be injected onto at least part of the surface of said fluidized bed. According to a particular embodiment, said fluid or fluids is/are gases and it includes a device enabling a liquid to be sprayed inside said central rotating tube or said fixed concentric tube.

FIG. 1a shows the cross section of an example according to a particular embodiment of this invention comprising the section of the fixed circular lateral wall (2) traversed by fluid injectors (3), that may for example be tubes generally with small diameters or longitudinal slits, fed with fluid (4) through the tubes (5) fixed along the wall (2) and enabling a fluid to be injected along this wall (2) in a transverse direction forming an angle of less than 45° with this wall (2). The solid particles (6) entrained by the fluid rotate along the wall (2) inside the circular or annular chamber (44), in this way form a rotating fluidized bed. The arrows (11) symbolize the fluid flow.

The section of the rotating central tube (7) equipped with vanes, blades or fins, hereinafter vanes (8) and openings for discharging fluid (9), rotate (47) in the same direction and more rapidly than the bed of solid particles (6) so as to accelerate the rotational movement of the fluid (13) which, having passed through said fluidized bed, enters the rotating tube (7) in the rotating discharge chamber (16) from whence it is drawn out by a device for discharging fluid. The centrifugal force produced by the rapid rotation of the tube and of its vanes, opposes the entrainment of solid particles (6) in the openings (9), that enables solid particles to be separated from the fluid that has passed through the fluidized bed before it is discharged. The vanes (8) may be profiled aerodynamically, as for example turbine vanes, so as to minimize turbulence in their wake.

Figure 1B:
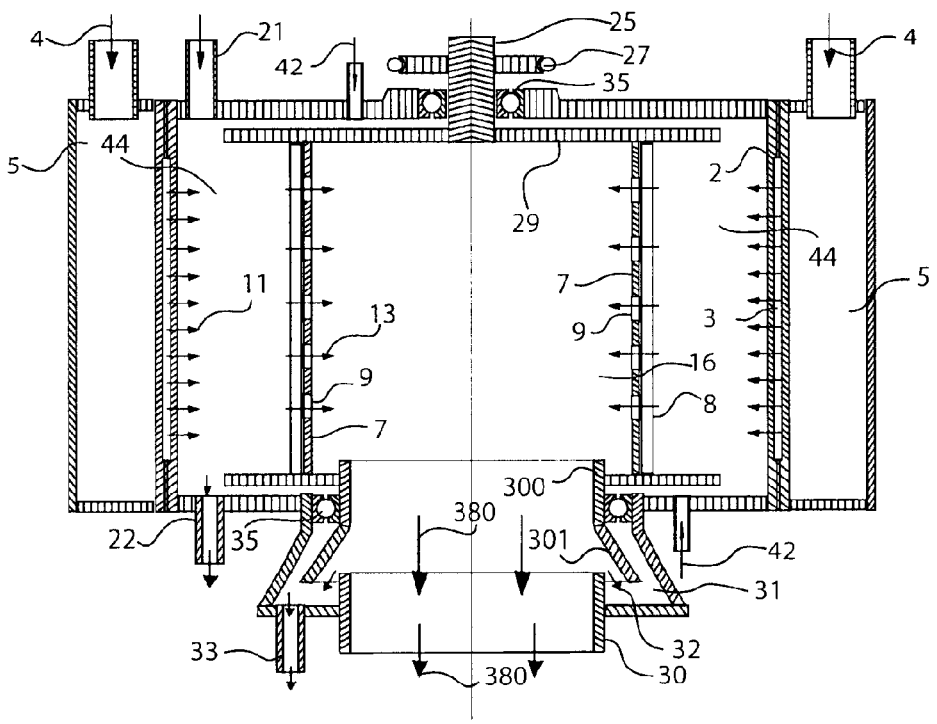

FIG. 1b shows the longitudinal section of the example of FIG. 1a. The solid particles are injected into the circular or annular chamber (44) through the tube (21) and are discharged from said circular or annular chamber (44) through the tube (22). The rotating tube (7) provided with openings (9) is connected by one of its sides (29) to a shaft (25) driven by a pulley (27). The rotating tube (7) is extended by a flared (301) tube (300) and enters a fixed chamber (31) acting as a cyclone where the solid particles (32) entrained by the fluid (13) are separated by centrifugal force from the fluid (380) that is discharged separately by a discharge device. These solid particles (32) may be recovered and discharged through the tube (33).

A device symbolized by ball bearings (35) hold said rotating tube and ensure leakproofness. A device (42) enables fluid to be injected between the sides (29) of the rotating tube and the sides of the circular chamber (44) in order to prevent solid particles from approaching the ball bearings (35).

Figure 2:
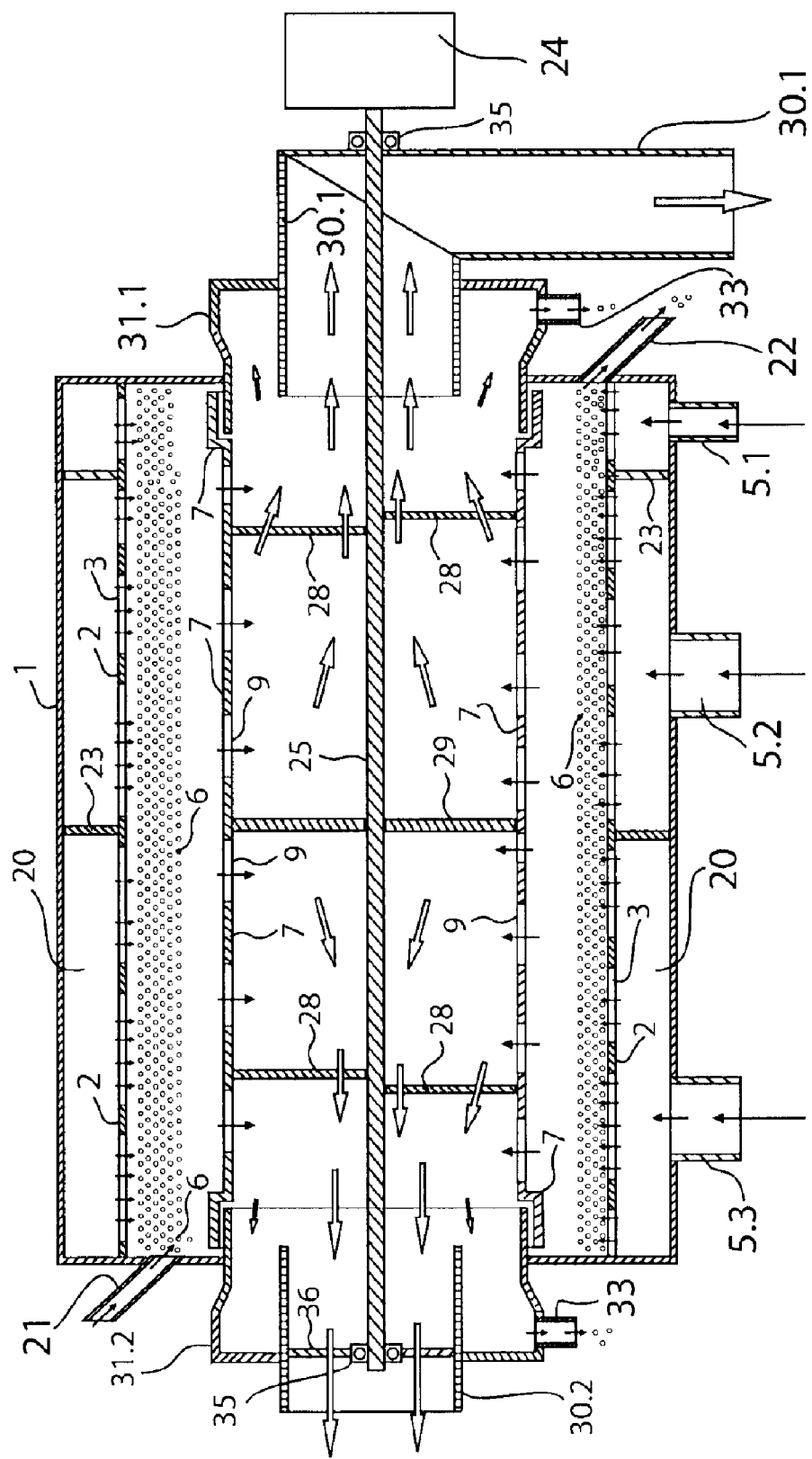
FIG. 2 shows the schematic longitudinal section of an example of a device with a rotating fluidized bed having a fixed circular wall (2) and a central rotating chimney, according to a particular embodiment of the invention.

FIG. 2 shows the longitudinal section of an example according to a particular embodiment of the invention comprising the section of the fixed circular lateral wall (2) surrounded by a fluid feed chamber (20) delimited by a fixed outer wall (1) fed with fluids through the feed tubes (5.1) to (5.3). The fluid injectors symbolized by the openings (3) provided in the fixed circular wall (2) enable fluids, coming from the feed chamber (20) along this fixed circular wall, to be injected along this circular wall (2) in a transverse direction forming an angle less than 45° with this wall (2) in order to cause solid particles (6) to rotate that are fed into the circular chamber through a tube (21) and, under the effect of centrifugal force, to accumulate them in a rotating fluidized bed sliding along the fixed circular wall (2).

The solid particles are then discharged through the discharge tube (22) and possibly recycled after adequate treatment. The level of the fluidized bed may be regulated by the position of this tube (22), more or less separated from the circular wall and therefore more or less close to the rotating tube (7). It is also possible, with the aid of several discharge tubes (22) positioned at different distances from the circular wall, to separate the particles according to their size or their density, the heavier or denser particles being concentrated along the circular wall.

The feed chamber (20) may be divided into several separate parts by annular partitions (23) so as to enable the circular chamber to be fed with fluids with different compositions and/or at different temperatures.

The central rotating tube (7), equipped with openings for discharging fluids (9) and possibly provided with vanes or fins, not shown in the figure, is driven in a rapid rotational movement by the motor (24) via a central transmission shaft (25) to which it is connected by spokes (28) enabling the fluid or fluids to pass and possibly a separating disc (29) that divides the central rotating tube into two separate parts.

The fluids, which rotate rapidly, are discharged from each side of central rotating tube through fixed tubes (30.1) and (30.2), while possibly passing through cyclones (31.1) and (31.2) enabling, by virtue of the speed of rotation of the discharged fluids, to separate the solid particles that would have been able to enter said central rotating tube, and to collect them through the tubes (33). The fluids may then be discharged and/or recycled to the feed chamber (20) after having been treated, for example cooled or heated and dried or purified, in treatment units not shown in the figure.

The central transmission shaft (25) is held by ball bearings (35) fixed against the wall of the fixed tube (30.1) and at the center of the fixed tube (30.2) by means of spokes (36) that allow the fluid to pass.

Figure 3:
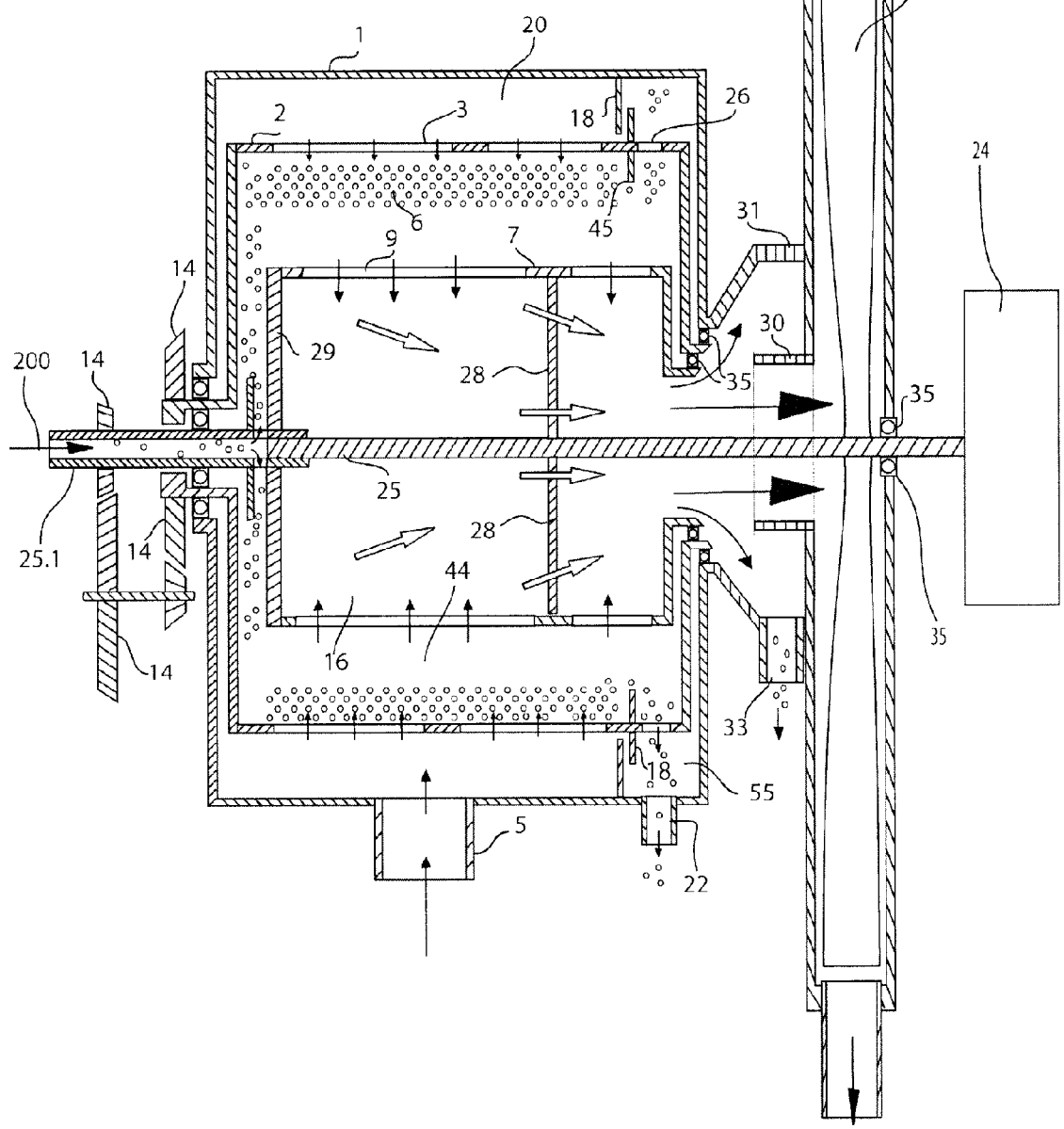
FIG. 3 shows the schematic longitudinal section of an example of a device with a rotating fluidized bed having a rotating circular wall (2) and a central rotating chimney according to a particular embodiment of the invention.

FIG. 3 shows the longitudinal section of a variant according to a particular embodiment of the present invention. The chamber for feeding in fluids (20) is delimited by a fixed outer wall (1) fed with fluids through a feed tube (5), and a rotating circular wall (2). Fluid injectors symbolized by the openings (3) provided in the rotating circular wall (2) enable fluids to be injected coming from the feed chamber (20) along this rotating circular wall (2) in order to rotate the solid particles that are fed (200) into the circular chamber via the hollow transmission shaft (25.1).

The feed chamber (20) may be separated by a device symbolized by separating rings (18), one being fixed to the fixed wall (1) of the feed chamber and the other in a more or less leakproof manner, to the rotating circular wall (2) of the chamber (55) for discharging solid particles, discharged from the chamber (44) through openings (26), in order to prevent the passage of solid particles to the feed chamber (20). The solid particles are discharged from the discharge chamber (55) through the tube (22). The thickness of the fluidized bed is regulated with the aid of a regulating ring (45).

The central rotating tube (7) equipped with openings for discharging fluid (9) and possibly provided with vanes or fins, not shown in the figure, is driven in a rapid rotational movement by the motor (24) by a central transmission shaft (25) to which it is connected by spokes (28) enabling the fluid or fluids to pass. A solid disc (29) closes the end of the central rotating tube (7) and connects the central rotating tube (7) to the transmission shaft (25) and its hollow extension (25.1). The transmission shaft (25) is actuated by the motor (24) that may also drive the circular rotating wall (2). Toothed wheels (14) schematize the transmission of the rapid rotating movement of the transmission shaft (25) to the slowly rotating circular wall (2) with reduction of the speed of rotation.

The fluids are drawn off through openings (9), for example by means of a fluid-discharge device, for example by a turbo compressor symbolized by the blades (41) while passing through the spokes (28) that connect the central rotating tube (7) to the transmission shaft (25). The rapidly rotating fluids are discharged from the central rotating tube through a fixed tube (30) for discharging fluid, while possibly passing through a flared tube acting as a cyclone (31) making it possible, by virtue of the speed of rotation of the discharged fluids, to separate the solid particles that would have been able to enter the central rotating tube, and to collect them through the tubes (33).

The central transmission shaft (25) is held by the ball bearings (35) symbolizing the sealing or separating device between the various rotating cylinders.

Figure 4:
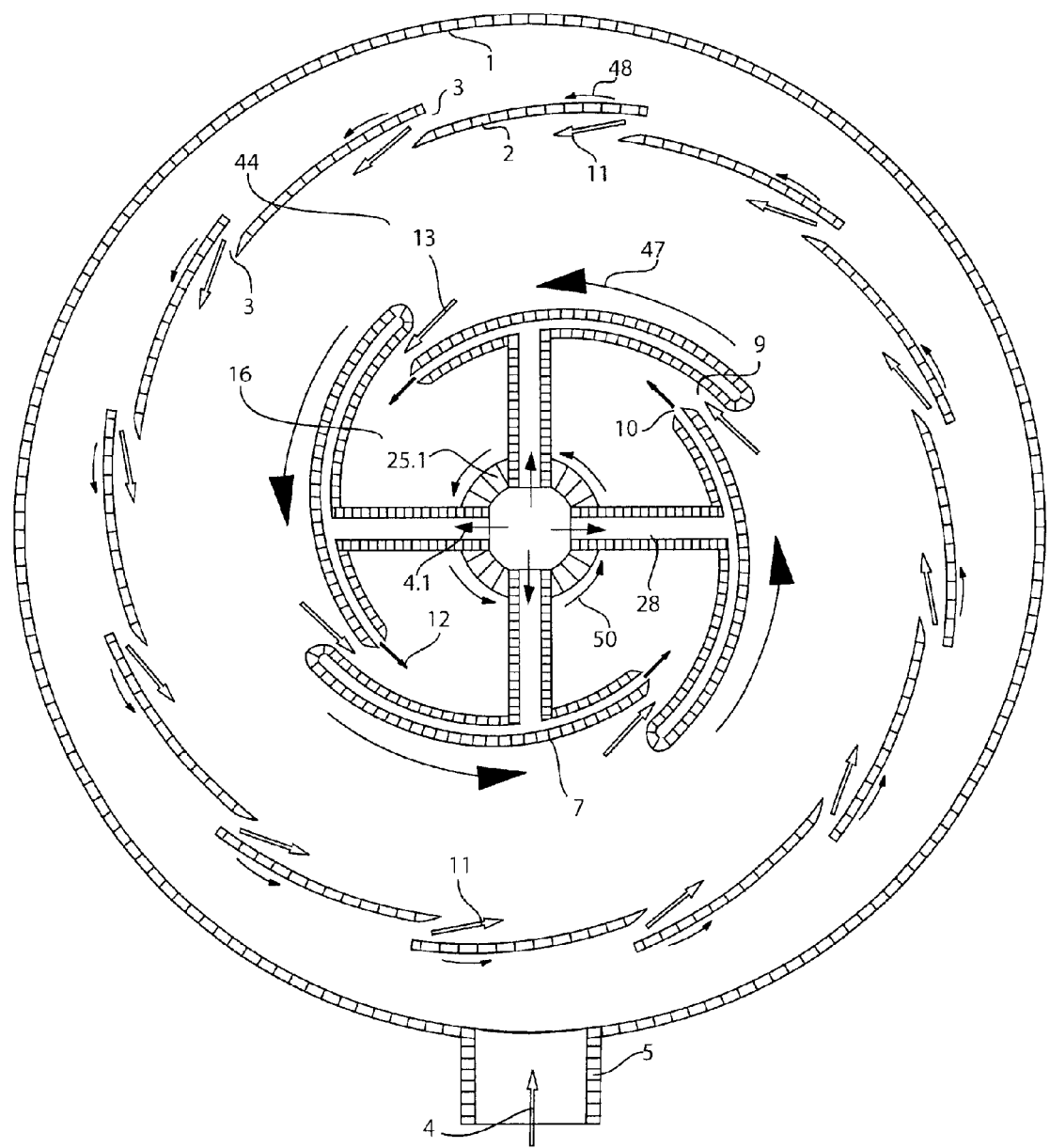
FIG. 4 shows a schematic cross section of an example of an annular chamber rotating inside a fixed chamber, according to a particular embodiment of the present invention.

FIG. 4 shows an example in cross section of a rotating reactor according to a particular embodiment, comprising a fixed outer wall (1) surrounding a fixed feed chamber (20) fed with fluid (4) through the tube (5) and an annular chamber (44) delimited by its outer rotating circular wall (2) and its inner rotating circular wall (central rotating tube) (7) and it is fed with fluid coming from the feed chamber (20) through injectors or openings (3) for injecting fluid. This wall (2) may have a slow porous rotating cylinder. In this example, the rotating wall (2) is traversed by fluid injectors (3), which may be for example tubes that generally have a small diameter, or longitudinal slits enabling a fluid to be injected along this outer rotating wall (2).

The central rotating tube (7) equipped with openings for discharging fluid (9) rotates in the same direction and more rapidly than the outer rotating wall (2) so as to accelerate the rotational movement of the fluid that, having passed through the fluidized bed, is drawn off through the tube (7) through its openings (9). The arrows (50) and (47) symbolize respectively the rotation of the transmission shaft (25) and of the wall of the central chimney (7) connected to the shaft by spokes (28). The arrows (48) symbolize the slower rotation of the rotating wall (2) showing the direction and amplitude of the speed of rotation. The arrows (11) and (13) show the direction of flow of said fluid.

The blades (7) forming the central rotating tube may be hollow and fed with fluid (4.1) through the transmission shaft (25.1) and spokes (28) or the wall (29), not visible in FIG. 4, which may also be hollow. This fluid (4.1) is injected (12) through openings (10) at the ends of these blades (7) in the direction of rotation (47) in order to accelerate the solid particles that are entrained by the fluid (13).

This latter device may increase the centrifugal force exerted on the solid particles inside the rotating discharge chamber (16) so as retard their entrainment to the outlet for fluids. It also makes it possible to cool the blades (7). It is therefore particularly advantageous for methods for the gasification or combustion of solid particles such as coal dusts or ground biomasses by reducing the quantity of fluid that has to be injected into the annular chamber. This makes it possible to have a lower temperature in the annular chamber (44) and to complete gasification in the rotating chamber at the desired temperature, generally very high.

This device with hollow blades (7) with fluid injection (12) is also applicable to rotating chimneys of which the outer circular wall (2) is fixed and of which the annular chamber is rotating, that is to say of which the outer circular wall rotates at the same speed of rotation as the inner circular wall.

Figure 5:
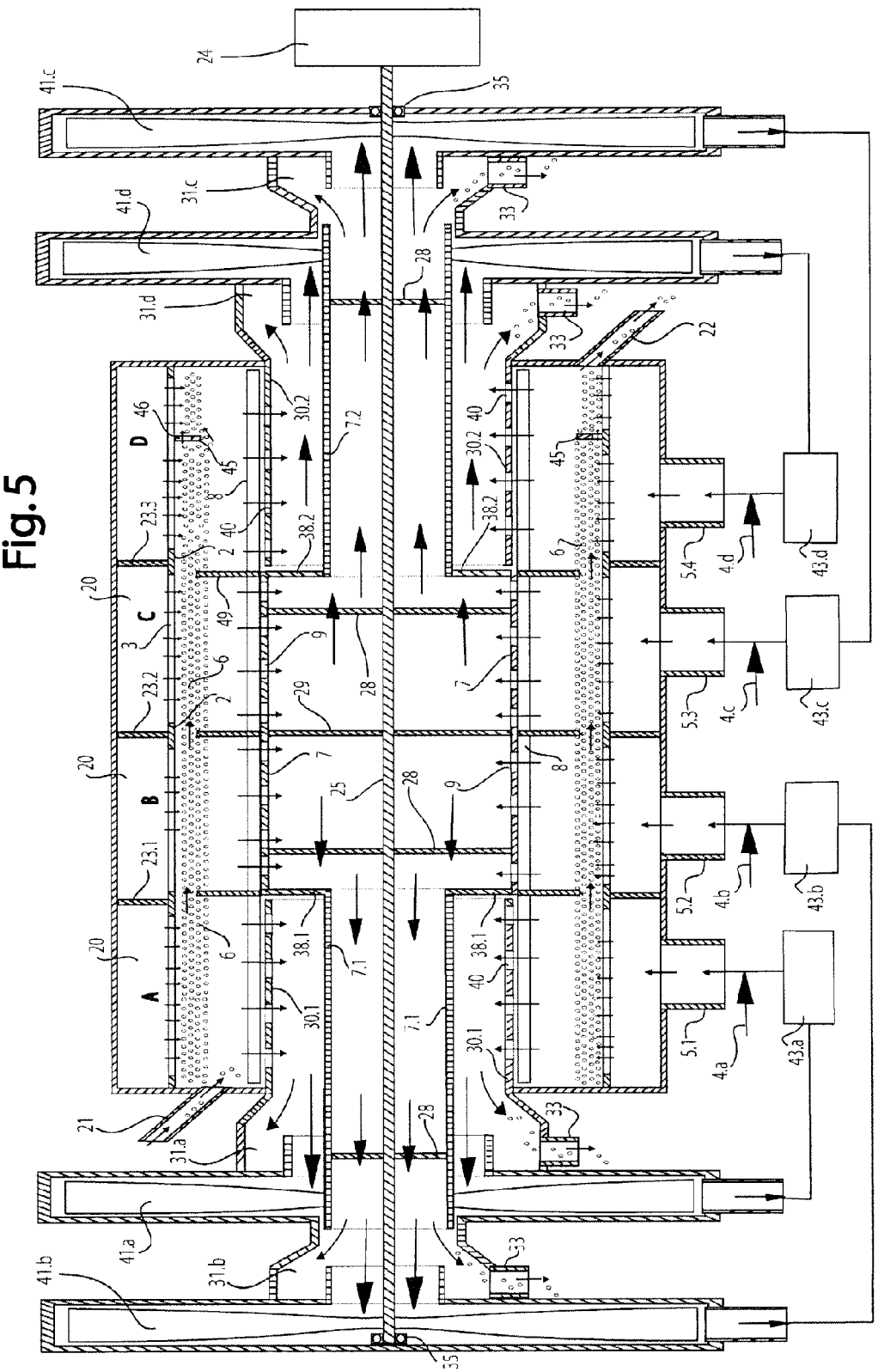
FIG. 5 shows a schematic longitudinal section of an example of a device with a rotating fluidized bed having a fixed circular wall (2) and a central rotating chimney, according to a particular embodiment of the invention.

FIG. 5 shows the longitudinal section of a variant of the invention. The fluid feed chamber (20) comprising a fixed outer wall (1) is divided into four sections A, B, C and D by annular partitions (23.1) to (23.3) so as to be able to feed in fluids with different compositions and/or temperatures and/or pressures through the fixed circular wall (2) by fluid injectors symbolized by the openings (3).

The central rotating tube (7) is provided with openings (9) only in zones delimited by the annular sections B and C. It is extended either side of these zones by two rotating tubes with a smaller diameter (7.1) and (7.2) that are connected by annular discs (38.1) and (38.2) and through which fluids may be discharged. It is equipped with several vanes or fins (8) that are fixed and extend close to the two sides of the fixed circular chamber. They are symbolized by the rectangles (8).

The central rotating tube (7) is also surrounded by annular discs (49) that may enter inside the fluidized bed so as to separate the gas flows coming from various sections of the feed chamber (20) and that pass through the fluidized bed. These annular discs may also be helical coils or their outer edge that enters the fluidized bed may be equipped with vanes that may cause the solid particles (6) of the fluidized bed to move forward.

The fluids injected transversely and approximately tangentially along the circular surface (2) of the sections B and C pass through the bed of fluidized solid particles (6) while causing them to rotate along the circular surface (2). The speed of rotation of the fluids is then accelerated by the vanes (8), before they enter the central rotating tube (7) through the openings (9). A disc (29) connecting the tube (7) to the shaft (25) may divide the tube into two independent parts.

The fluids are then drawn off respectively for example by turbo compressors or turbines having blades (41.b) and (41.c) while passing through the spokes (28) that connect the central rotating tube (7) to the transmission shaft (25) actuated by the motor (24) that may also drive the turbo compressors or turbines. The cyclones (31.b) and (31.c) enable the solid particles that would have been entrained by the fluid to be separated from the fluid and to collect them through the tubes (33).

The fluids injected transversely and approximately tangentially along the circular surface (2) of the sections A and D also pass through the bed of fluidized solid particles (6) while causing them to rotate. The speed of rotation of the fluids is then accelerated by the vanes (8) and the fluids then enter through the openings (40) into the fixed tubes (30.1) and (30.2) surrounding the rotating tubes (7.1) and (7.2). They are drawn off respectively for example by turbo compressors having turbine blade wheel (41.a) and (41.d) that may be driven by the rotating tubes (7.1) and (7.2). The openings (40) may be profiled in order to facilitate the entry of gas and to maintain its rotational movement inside the fixed tubes (30.1) and (30.2), in order to permit the separation, in the cyclones (31.a) and (31.d), of fluids and solid particles possibly entrained by these fluids.

Fresh fluids (4.a) to (4.d) may be introduced into the sections A to D through inlet tubes (5.1) to (5.4) situated in the outer wall (1) of the feed chamber and the fluids that have passed through the fluidized bed (6) and have been compressed by the turbines (41.a) to (41.d) may be discharged and/or conveyed to treatment units (43.a) to (43.d) and recycled, either in their original section A to D as shown in the figure or in another section according to requirements.

The solid particles, that are fed from one side of the circular chamber (2) through the tube (21) progressively fill the fluidized beds (6) and are then discharged through the tube (22) situated on the other side. The thickness of the fluidized bed may be maintained at a more or less constant level with the aid of a regulating ring (45) positioned against the circular wall (2) close to the discharge tube (22). This ring may be provided with one or more passages (46) enabling the coarser or heavier solid particles, that have a tendency to concentrate along the annular wall, to pass from the other side of this regulating ring.

The axis of rotation of the fluidized bed may be horizontal, inclined or vertical. This makes it possible to increase the longitudinal speed of solid particles and therefore to reduce their dwell time. If this axis is strongly inclined or vertical, the thickness of the fluidized bed is greater at the bottom due to gravity which may limit the length of the circular chamber. In this case, it is sufficient to divide the fluidized bed into several sections with the aid of separating rings or helical coils positioned along the circular wall, with or without passages along the circular wall for enabling solid particles to pass along this wall.

These rings or helical coils may be hollow and fed with fluids injected in the direction of rotation of the fluidized bed along the surface of these rings, preferably from the upper side, in order to facilitate the rotation of solid particles along their surface. They may also be used when the axis of rotation is horizontal or slightly inclined in order to guide the solid particles in the desired direction. Rings or helical coils with a smaller external diameter may also be fixed to the central rotating chimney in order more successfully to separate the flow of fluids coming from various sections and/or to guide the solid particles in the longitudinal direction.

If injection of the fluid or fluids that pass rapidly through the rotating fluidized bed is/are sufficiently uniform in order to minimize longitudinal mixing of the solid particles and if the thickness of the fluidized bed is relatively thin and the length of the circular chamber relatively large, the solid particles fed from one side of the circular chamber will move relatively uniformly to the other end. The circular chamber may also be divided into annular sections which may have different dimensions and that may be traversed by fluids with variable compositions and/or temperatures and/or flow rates and speeds.

This may be particularly advantageous in many applications. For example, for polymerization methods, the solid catalytic particles increase in size progressively during polymerization while passing through successive sections and their catalytic activity falls progressively. This change in activity and the particle size of catalytic particles may be compensated for by adapting, from one section to another, the injection speed, the flow rate, the temperature and composition of the fluid that passes through the fluidized bed and by increasing progressively or in steps the diameter of the circular wall (2) in order to increase the thickness and therefore the volume and therefore the dwell time of the catalytic particles and of the fluid that passes through the fluidized bed. For the gasification of solid carbonaceous particles (biomasses, coal etc), the size of particles will become less and the activity connected with the mass/area ratio will increase. In this case it is possible to reduce progressively the diameter of the circular chamber by giving it a slightly conical form in order to reduce progressively the thickness of the fluidized bed.

Conversely, if this is desirable, it is possible to impose good longitudinal mixing of solid particles with the aid of deflectors or helical coils fixed to the circular wall and/or to the central chimney and/or injectors that can inject the fluid in a direction having a longitudinal component and/or by increasing the ratio between the thickness of the fluidized bed and the length of the circular chamber.

It may be desirable, for example if the dwell time of the solid particles in the reaction chamber is relatively short, to inject solid particles into the reaction chamber with a relatively high speed, of which the longitudinal component promotes mixing of solid particles and the tangential component at the circular wall enables greater speed of rotation of the fluidized bed to be obtained.

The solid particles may be fed from one side of the fixed cylindrical chamber and discharged from the other side with an average dwell time of several seconds to several hours according to the requirements of the application, for example according to the polymerization rate, and the positioning of the tubes for discharging solid particles makes it possible to discharge selectively the coarser solid particles (close to the circular wall) and/or finer ones (closer to the rotating gas discharge tube). The solid particles may also be fed in and/or discharged through the circular wall.

A screw or helical coils fixed to the central rotating chimney and slightly entering the fluidized bed, may entrain the finer or lighter particles in a horizontal direction while the slope of the reactor and/or the fluid injectors and/or the deflectors or helical coils fixed to the circular wall may entrain the particles circulating along the circular wall, that is to say the heavier or coarser ones in the opposite direction, which gives good classification of particles that may for example be injected in the middle of the reactor.

The solid particles may be partly or totally recycled into the circular chamber, directly or after adequate treatment, for example regeneration, and several circular chambers may be put in series, particles discharged from one circular chamber being fed into the following chamber.

Similarly, fluids may be partly or totally recycled after suitable treatments, for example, dried, purified, cooled or reheated, and if the device for feeding in and discharging these fluids makes it possible to feed them separately into successive sections of the circular chamber and to discharge them and treat them separately, these fluids may be recycled in the same section or in another section according to the requirements of the application.

The very short dwell time of the fluid in the fluidized bed, rapid and successive pressure variations enabling the porous particles to breathe, the differences in speeds between the solid particles and the fluid, as well as the very small size of the solid particles, permit particularly high mass and calorie transfer rates at very stable temperatures. It is particularly suitable for a very rapid and endothermic or exothermic chemical reactions involving micro-particles or variations in size or of specific gravity of solid particles, but it also permits rapid classification, drying or coating of fine particles that are difficult to fluidize by conventional methods.

With a conventional rotating fluidized bed, supported by a rotating porous cylinder integral with the central tube for discharging fluid, it is impossible to obtain a very high centrifugal force close to the central tube for discharging fluid (for example 5,000 times gravity) without having an even higher centrifugal force along the porous wall supporting the bed of particles, which is too high for fluidizing the bed with a gas flow passing through the bed of solid particles at a sufficiently low speed, for example 0.4 m/s, so as not to entrain the smaller particles inside the central chimney. Moreover, forces exerted on the support, the vibrations caused by agitation of the solid particles and the difficulty of ensuring continuous feed of solid particles, unavoidably through the central rotating tube, and of discharging them, unavoidably through the gas feed chamber, are obstacles for their construction on an industrial scale.

It is also possible, when the main fluid is a gas, to spray fine droplets of a liquid onto the fluidized bed through the fixed tube (30.1) or (30.2) or through the rotating tube (7) while passing along the transmission shaft (25) and through one or more spokes (28) and possibly along one or more vanes (8). This is particularly useful for cooling, impregnating or coating solid particles or when one of the reactive fluids is preferably a liquid.

A liquid may also be sprayed inside the rotating tube and/or fixed tubes, for example in order to cool a gas suddenly that has been discharged. This is particularly valuable for obtaining intermediate products requiring very short gas residence times.

According to another particular embodiment, illustrated in FIGS. (6) and (7), the present invention also includes injection inside a rotating annular chamber (44) containing solid particles and traversed by one or more fluids, this fluid or these fluids being in the form of numerous jets or thin layers in a direction opposite the direction of rotation of the rotating annular chamber, so as to cause the solid particles to rotate in a contrary direction pushed against the outer wall by centrifugal force so as to reduce the centrifugal force there and therefore to fluidize them more easily. The speed of injection of the fluid is at least equal to half the speed of rotation of the outer rotating wall and preferably a speed greater than the speed of rotation in order to maintain rotation of the fluidized bed at a lower speed, but of the same order of magnitude and preferably at least half of the speed of rotation of the annular chamber.

According to this particular embodiment of the injection, the device includes a fixed feed chamber (20) inside which an annular chamber (44) is situated that is capable of rotating about its axis of symmetry, that may contain solid particles and that is delimited by lateral walls (39), an outer circular wall (2), provided with fluid injection openings (3) regularly distributed along its surface and an inner circular wall (7), provided with discharge openings (9);

a central discharge chamber (16) surrounded by said inner circular wall (7);

a device for feeding one or more fluids (4) into said fixed feed chamber (20);

a device for discharging said fluid or fluids that may discharge said fluid or fluids (380) from said central discharge chamber (16)

characterized in that:

the fluid-injection openings (3) passing through said outer circular wall (2) for feeding said annular chamber (44) with said fluid or fluids is/are oriented in a direction opposite to the direction of rotation of the circular walls (2) and (7) and the discharge openings (9) passing through said inner circular wall (7) for discharging the fluid or fluids in the central discharge chamber (16) are oriented in the direction or radially in the direction of rotation of the circular walls (2) and (7).

Figure 6:
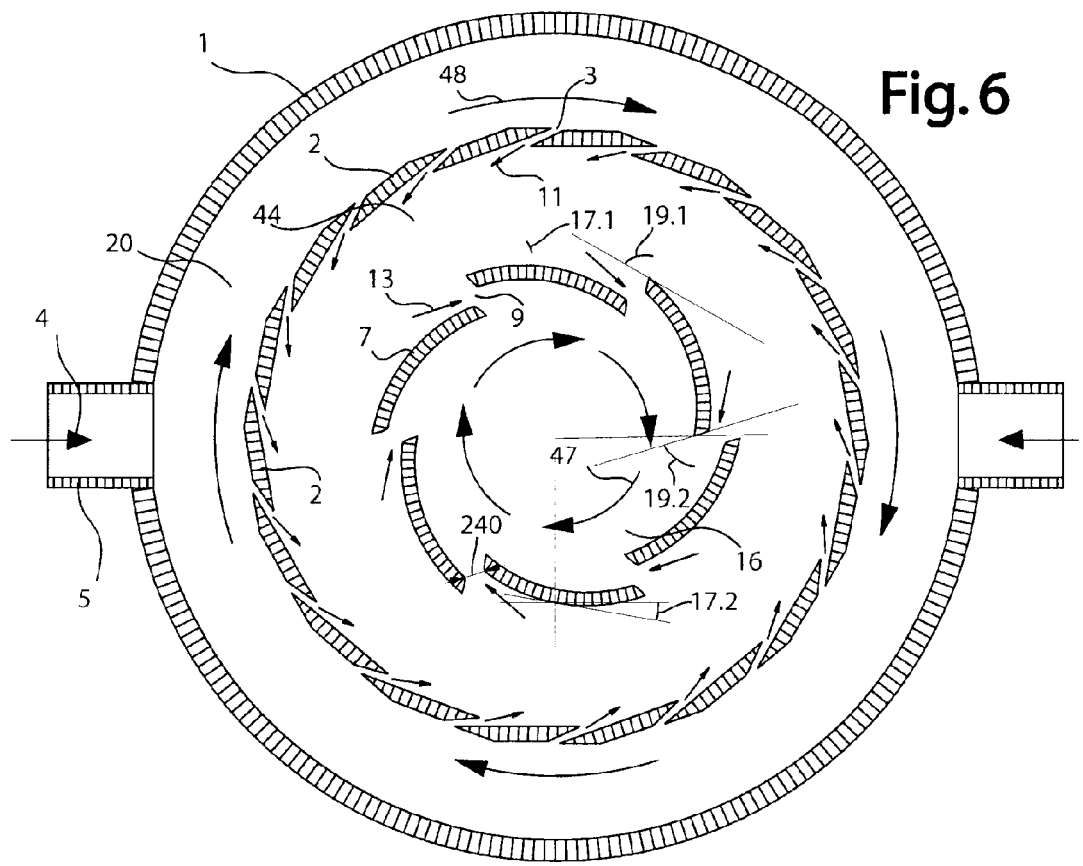
FIG. 6 shows the schematic cross section of an example of an annular chamber rotating inside a fixed chamber with fluid injection in a direction opposite to the direction of rotation, according to a particular embodiment of the present invention.

FIG. 6 shows an example of a cross section of a rotating reactor according to a particular embodiment comprising an inner fixed envelope (1) surrounding a fixed feed chamber (20) fed with fluid (4) through the tubes (5). The annular chamber (44) delimited by the outer circular wall (2) and its inner circular wall (7) rotates in the direction of the arrows (48) and (47) and is fed (11) with fluid coming from the feed chamber (20) through injectors or openings (3) for injecting fluid in the direction of the arrows (11) opposite to the direction of rotation (48) and (47). The fluid is discharged (13) through the inner circular wall (7) through discharge openings (9) in the direction of the arrows (13) oriented in the direction of rotation (47) and it enters the central discharge chamber or central chimney (16).

In this example, the outer circular wall (2) is symbolized by trapezoidal sections of long laths (2) perpendicular to the plane of the figure and separated by long longitudinal slits (3) for injecting fluid, and the inner circular wall (7) is symbolized by sections of long curved lathes of blades (7), slightly inclined and separated by the longitudinal discharge openings (9).

The rotating annular chamber (44) contains solid particles, not shown. These are pushed against the circular wall (2) by centrifugal force and toward the inner circular wall (7) by the centripetal pressure of the fluid that passes through the rotating annular chamber (44). The direction of injection of the fluid (11) has slowed down the rotation of solid particles close to the outer circular wall (2) by causing them to rotate in a contrary direction and the direction for discharging (13) the fluid accelerates the rotational speed of the solid particles entrained by the fluid or fluids close to the discharge openings (9).

The solid particles, of which the rotational speed is slowed by injection of fluid (11) along the outer circular wall (2), are easily fluidized by this fluid. Consequently they form a rotating fluidized bed of which the density close to the outer circular wall (2) falls rapidly with an increase in the flow rate of the fluid.

When the solid particles entrained by the fluid approach the inner circular wall (7), their rotational speed is accelerated by discharge (13) of the fluid. Increase in centrifugal force prevents their discharge, if the rotational speed of the rotating annular chamber is sufficiently rapid, which increases the density of the fluidized bed in layers close to the inner circular wall (7), contrary to what occurs in conventional fluidized beds with a rotating reactor.

Also, if the solid particles have substantially different sizes, it is possible to fluidize the coarser particles close to the circular wall (2) without losing the finer ones that concentrate close to the inner circular wall (7). In conventional rotating reactors, an increase in the fluid flow rate necessary for fluidization of coarse particles automatically entrains the finer particles toward the discharge chamber or blocks the filter if the inner circular wall includes a filter.

According to a particular embodiment, in order to be able to fluidize relatively coarse solid particles, it is necessary for the centrifugal force exerted on the solid particles along the outer circular wall (2) to be not too high and thus the inverse rotational speed of said fluidized bed formed by the solid particles to be sufficiently high, generally at least half the speed of rotation of the outer circular wall. To this end, and also to avoid large non-homogeneities and instabilities of the fluidized bed, it is desirable that the direction of injection of fluid forms an angle of less than 30° with said wall (2), that the speed of injection of the fluid is at least half and preferably greater than the speed of rotation of said wall (2) and that in any annular section with a thickness equal to the average distance between the inner (7) and outer (2) circular wall of the rotating annular chamber (44), the distance separating two fluid injectors (3) is less than or double said distance.

The shape of the inner circular wall, shown in FIG. 6 by the slightly inclined blades (7), may also have a considerable influence on the behavior of the fluidized bed. If the angle between the tangent to the surface of a blade in a given point and to the circumference centered on the axis of rotation passing through the same point, called the slope or inclination or angle of incidence (17.1) or (17.2), is small, the solid particles will slide along the wall. On the other hand, if it is large, as in this example, the angle (19.1) or (19.2) representing the slope of the outer or inner end of the blades (7), the solid particles are repelled or attracted by said blades, generally with formation of a vortex of said particles. Also, if these vortices have a size comparable to the width of the rotating annular chamber in (44), as in FIG. 8, they may generate instabilities inside the fluidized bed.

In order to reduce the influence of vortices generated by the blades (7), it is desirable for the width of the openings (9) or the distance (240) that separates the outer end of the blade (7) from the following blade, to be less than the distance that separates it from the outer circular wall (2).

Figure 7:
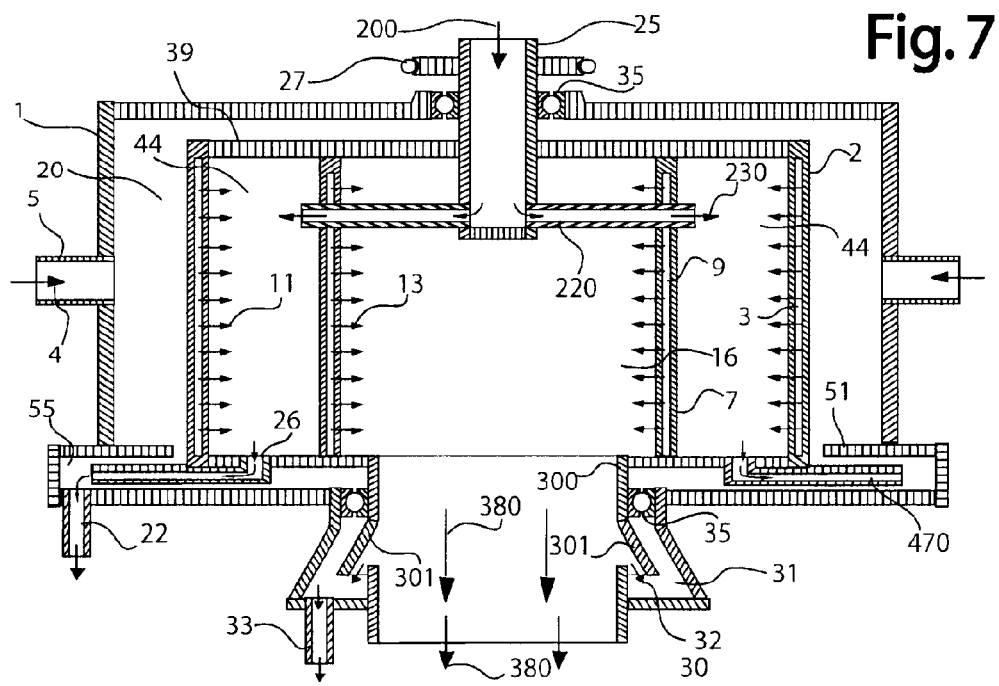
FIG. 7 shows the schematic longitudinal section of the example of FIG. 6.

FIG. 7 shows the longitudinal section of the rotating reactor (6). The arrows (11) and (13) show the radial component of the direction of injection and discharge of the fluid through the circular walls (2) and (7) and the rectangles (3) and (9) symbolize the openings for injection and discharge of fluid, that are in this example long longitudinal slits passing through all the width of the annular chamber (44) that is closed by the lateral wall or sides (39).

Solid particles (200) are fed through the hollow shaft (25), entering the rotating discharge chamber (16) through the fixed envelope (1) and a rotating lateral side (39) through the tubes (220) passing through the inner circular wall (7) and entering (230) the rotating annular chamber (44) where they are pushed by centrifugal force toward the outer circular wall (2). A suitable device, symbolized by the ball bearings (35) ensures leakproofness between the hollow shaft (25) and the fixed wall (1). A pulley (27) enables the hollow shaft (25) to be connected to a motor, not shown, enabling the rotating annular chamber (44) to rotate.

The rotating discharge chamber (16) is extended beyond the envelope (1) by a rotating tube (300) that is flared out (301). Under the effect of centrifugal force, solid particles entrained by the discharge of fluid (13) are concentrated (32) along the wall of the rotating tube (300) and are discharged through the separating chamber (31), acting as a cyclone, to a recovery device through the tube (33). The fluid (380) cleared of solid particles by centrifugal force, is discharged through the fixed tube (30). A suitable device, symbolized by the ball bearings (35), ensures leakproofness between the rotating tube (300) and the fixed envelope (1).

The solid particles are discharged from the annular rotating chamber (44) through one or more openings (26) in a side wall (39), connected to a rotating tube (470), to the discharge zone (55) where they are discharged through the tube (22). A partition (51) symbolizes the separation between the fluid feed chamber (20) and the zone for discharging (55) solid particles. According to a particular embodiment, the pressure in the feed chamber (20) is preferably higher in order to prevent solid particles from entering there and the pressure in the discharge zone (55) should be sufficiently low in order to cause the solid particles to enter the opening (26), but the centrifugal force inside the tubes (470) may enable this pressure to be increased so as to be close to the pressure in the feed chamber (20) and thus to limit fluid losses through the separating device to the discharge zone.

The quantity of solid particles inside the rotating annular chamber (44) may be automatically regulated by moving the openings (26) of the outer circular wall (2) apart. It may also be influenced by the pressure difference between the discharge zone (55) and the pressure in the annular chamber (44) facing the openings (26), as well as by the density of the fluidized bed and therefore by the rotational speed of the annular chamber (44) and by the fluid flow rate.

The position of the openings (26) also makes it possible to influence the particle size of the solid particles discharged through these openings (26), the coarser or heavier particles being concentrated close to the outer circular wall (2) and the finer or lighter particles being concentrated close to the inner circular wall (7).

Changes in the direction of the flow of fluid and of solid particles bring about the formation of vortices that encourage the transfer of solid particles and of kinetic moment between the various layers of the fluidized bed.

Figure 8:
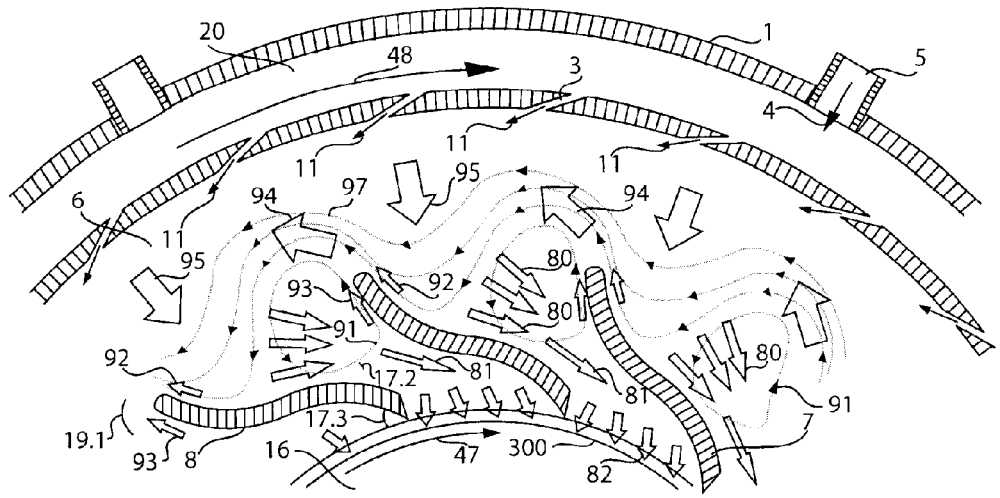
FIG. 8 shows the schematic cross section of an example of blades with a variable angle of incidence, according to a particular embodiment of the present invention.

FIG. 8 illustrates a particular embodiment showing schematically the influence on the formation of vortices of the shape and number of the blades (7) delimiting the openings for discharging fluid from the annular chamber (44), while showing the cross section of three blades (7) of which the S-shape makes it possible to have a large inclination (19.1) and (17.3) of more than 45° at its ends, and a small inclination (17.2) of less than 30° in its middle part. These blades face the fluid injectors represented as slits (3).

In this example, the fluid is drawn off by the pressure reduction of the rotating discharge chamber (16). It first of all enters the wide space between the blades (7) at a low speed in the direction of the arrows (80), of which the tangential component is large by reason of the small inclination (17.2) of the middle part of the blades (7). It is then accelerated progressively as the space between the blades narrows, to reach a maximum speed (81) and it then slows down while taking an increasingly radial direction (82) by reason of the increase in the inclination (17.3) of the inner part of the blades (7) before entering the rotating discharge chamber (16) and being directed longitudinally, that is to say perpendicular to the plane of the figure, toward the outer rotating tube, shown schematically by portions of circles (300).

Sharp edges along the inner borders of the blades generate micro-turbulence and therefore pressure loss which makes it possible to distribute better the discharge of fluid along the discharge openings.

The solid particles that follow the undulating lines of flow (97) of the fluidized bed are pushed by the fluid (80) toward the discharge openings (9).

The middle part of the blades, of which the inclination (17.2) is here less than 30°, orients the fluid (8) and therefore also the solid particles in a direction of which the tangential component is large and directed in the direction of rotation of the annular chamber. Solid particles, entrained by the fluid, thus acquire a high tangential speed and, if the rotational speed of the annular chamber is sufficient to generate a centrifugal force greater than the centripetal pressure of the fluid on the solid particles, centrifugal force pushes them along the inner surface of the outer part of the blades in the direction (93), following the inclination (19.1) which is here greater than 60°.

Similarly, the solid particles that approach the outer surface of the outer part of the blades, where the inclination (17.1) is also high and where the centripetal pressure of the fluid is relatively low, are accelerated by said blades and centrifugal force pushes them in the direction (92).

The flow of solid particles (92) and (93) exert a dynamic pressure (94) that causes the fluidized bed to undulate and initiate vortices of solid particles (91) between the middle part of a blade and the outer part of the preceding blade. These vortices return the solid particles, that have failed to be entrained in the central discharge chamber (16), inside the fluidized bed. However, the pressure exerted by the flow of solid particles (92) and (93) on the fluid injectors (3) situated facing these flows will reduce the quantity and speed of the fluid injected by these injectors to the benefit of other fluid injectors (3), generating a dynamic pressure (95) that pushes back the solid particles toward the central discharge chamber (16).

These dynamic pressures in a contrary direction may initiate vortices, not, shown in FIG. 8, rotating in the opposite direction to the vortices (91) between the outer part of the blades (7) and the fluid injectors (3). Moreover, if the distance between the outer ends of the blades (7) is large in relation to the distance that separates them from the outer circular wall (2), these vortices may fragment the fluidized bed.

In order to reduce this risk, the slope (71.1) of the outer surface of the outer part of the blades (7) may be reduced and therefore the pressure of solid particles that slide along the outer surface of the blades (7), while retaining a large slope on its inner surface, as shown in FIG. 6, in order to be able to repel the solid particles towards the fluidized bed along this surface, while only producing small vortices.

This shape makes it possible to reduce shear forces in the fluidized bed and to obtain a layer of fine solid particles sliding along the inner circular wall (7) and coarse particles along the outer circular wall (2). However, according to the applications, it may be desirable to obtain strong agitation in order to improve mass transfers and to prevent the formation of agglomerates. In this case, the S-shaped profile is favorable and prevents the formation of large vortices generating instabilities. According to a particular embodiment, the number of blades should be sufficient so that the distance between their outer ends is not too great in relation to the distance that separates them from the outer circular wall (2) and preferably so that it is less than double this distance. The gas flows (11) that are injected through the openings (3) should also not be too sensitive to pressure variations along the inner surface of the outer circular wall (2). This may be ensured with the aid of constrictions similar to those that are described in FIG. 9.

Figure 9A:
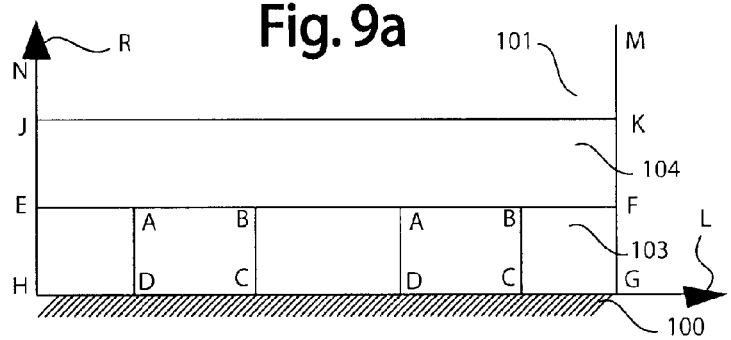
FIG. 9a shows a schematic front view of an example of fluid injection with sudden longitudinal and radial expansion, according to a particular embodiment of the present invention.

FIG. 9a is a schematic front view of a gas flow entering the rotating annular chamber, according to a particular embodiment, through the openings with sections (ABCD), in a direction (T) perpendicular to the plane of the figure, approximately tangential to the outer circular wall, of which the cross section is symbolized by hatching (100) and the inner surface (JKMN), along which the solid particles slide, symbolized by the hatching in fine lines (101). The sections (EADH), (BADC) and (BFQC) hatched in fine lines (103) are closed over a short distance and the section (EFKJ) hatched in fine lines (104) is closed over a little longer distance, enabling the fluid flows to undergo a first sudden expansion in a longitudinal direction followed by a second sudden expansion in a radial direction, the two successive sudden expansions being accompanied by the formation of micro-turbulence, before entering the annular chamber and of encountering there the solid particles sliding along the inner surface of the outer circular wall (101) or (KJMN).

Figure 9B:
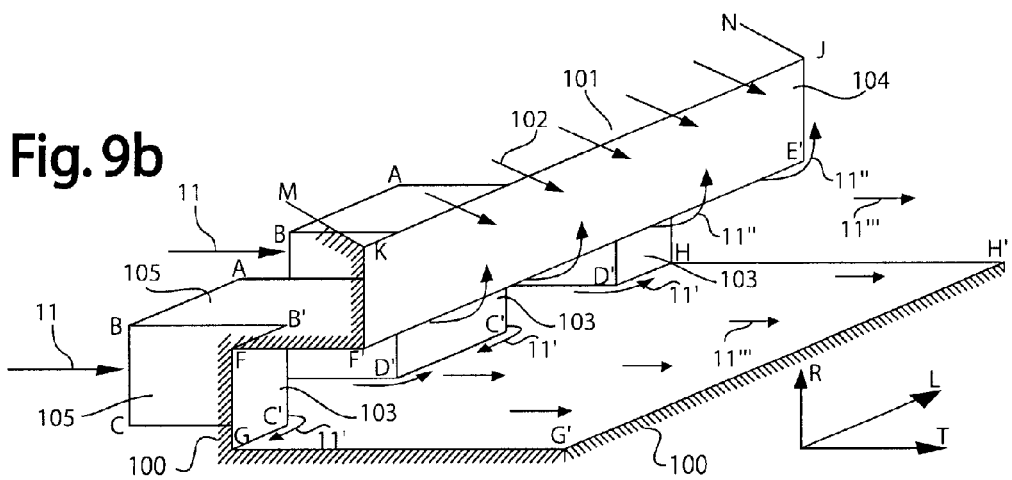

FIG. 9b is a schematic axonometric view of the example of FIG. 9a, which shows this fluid flow (11) that is guided by the outer circular wall of which the periphery of the cross section is only sketched in by hatching (100) so as more easily to visualize the outflow channels for gas of which some areas have been hatched in fine lines (105). (101) represents the inner surface of the outer wall.

In this example, the gas (11) enters two conduits with a cross section ABCD which suddenly become wider in a longitudinal direction (L) and join up. The fluid (11') is expanded longitudinally along surfaces (103), with the formation of small vortices in longitudinal planes, by reason of the sudden change of direction. It follows the new section EFGH over a short distance (FF') and it (11") is once again expanded along the surface (E'F'KJ) hatched in fine lines (104), in an approximately radial direction (R), with the formation of small vortices in transverse planes before encountering solid particles (102) that slide along the inner surface "JKMN" of the outer circular wall inside the rotating annular chamber.

Following this double expansion, the average speed of the fluid (11''') is reduced proportionally to the ratio of the sections and a good distribution of its kinetic energy is converted into micro-turbulence that is transferred to the solid particles, which improves their fluidization in all directions and therefore the homogeneity of the fluidized bed. Moreover, this lost energy results in a reduction in the pressure of the fluid that is approximately proportional to the square of the fluid flow rate. It thus reduces local differences in flow rates due to pressure variations along the outer circular wall, generated by the dynamic pressure of the flow (92) and (93) of solid particles repelled by the blades (7) of FIG. 8.

The ratio of the sections necessary for obtaining sufficiently homogeneous distribution of the fluid injection along the outer circular wall, depends on the amplitude of the pressure variations inside the fluidized bed. Simulations and experiments show that it is desirable for the pressure loss through the fluid injectors to be of the same order of magnitude, but acceptable results are already visible for pressure drops of a tenth, preferably a fifth, of the centrifugal pressure of the solid particles on the outer circular wall by reason of the stabilizing effect provided by micro-turbulence and the rotating fluidized bed once this is constituted.

FIG. 10a shows the cross section of an example of a particular embodiment of circular walls enabling this double sudden expansion of fluid to occur (11) and of which the inner circular wall is formed of blades (7) of which the curvature varies, vaguely following an S-shape of which the middle part has a smaller inclination than the inclination of the two ends.

The solid particles sliding along the outer end of these blades (7) are reconveyed by centrifugal force towards the inner surface (70) of the outer circular wall. Those that slide along the middle part are accelerated by the fluid that is directed (13) towards the opening (9), increasing the centrifugal force which prevents them from entering this opening (9) and directs them towards the inner part of the outer end of the preceding blade, along which they slide before being conveyed towards the inner surface (70) of the outer circular wall. The fluid separated from solid particles by centrifugal force, enters the opening (9) while progressively taking a radial direction and losing speed.

This S-shape encourages the formation of vortices of solid particles which, by transferring to the surface layers of the fluidized bed a quantity with a movement directed in the rotational direction (47) and (48) of the annular chamber (44), slows down the reverse rotation of these surface layers of the fluidized bed and thus increases there the centrifugal force and therefore the density of these layers.

The outer circular wall is formed of curved plates (70) separated by slits (3) and resting on the cylindrical wall (60) having many openings (61) drilled facing the slits (3). The fluid (62) enters the openings (61) radially and is deflected in the slits (3) in the direction (11) while undergoing expansion in the longitudinal direction, which slows it down and generates turbulence.

FIG. 10b shows an enlargement of one of these slits (3) facing an opening (61), in order to visualize the outlet from this slit (3) of which the edge (104) is truncated, which generates radial expansion of the fluid (11) with a second slowing of the fluid, and generates turbulence.

These retardations of the fluid with generation of turbulence involves energy expenditure and therefore a pressure loss that improves the homogeneity of the distribution of fluid, and micro-turbulence improves multi-directional fluidization of the fluidized bed in order to reduce non-homogeneities and instabilities of the fluidized bed that are generated by injection of jets or layers of fluid along a circular wall or by the influence of vortices of solid particles generated by the inner circular wall (7) which forces fluid and solid particles to rotate in a direction contrary to the injection of fluid (11).

FIG. 11 shows a variant of the longitudinal section of a similar reactor to that of FIG. 10 according to a particular embodiment, where the outer circular walls formed by rings (60) and plates (70) and inner ones (7) have the shape of truncated cones. The cylindrical wall (60) is replaced by a succession of rings (60) spaced so as to leave openings (61) that are annular openings, through which the fluid (62) must pass before entering and being expanded in the longitudinal slits, perpendicular to these annular openings. The feed chamber (20) is divided by annular partitions (51) and (51.1) into two or more sections that are fed separately with fluid through the tubes (5.1) and (5.2).

The fluid is then discharged through the openings (9) of the inner circular wall (7). These openings (9) may be closed locally, for example by rings (63), so as to impose restrictions and therefore a supplementary pressure drop that contributes to better distribution of the flows of this fluid along these discharge openings (9).

The solid particles (200) are fed in at the middle of the rotating annular chamber (16) through tubes (220) through the hollow transmission shaft (25.1) that is extended by a solid transmission shaft (25). They are discharged through these openings (26.1) and (26.2) in the two lateral walls (39). The openings (26.1) on one side are close to the inner wall (7) in order to recover the finer solid particles through the tube (22.1) and the openings (26.2) on the other side are close to the outer circular wall so as to recover the coarser particles through the tube (26.2). Solenoid valves may be provided in the tubes (471) and (472) so as to control the discharge of solid particles.

The fixed tube (30) is flared out and leads the fluid (380), freed from solid particles by the separating chamber or cyclone (31), to a fluid-discharge device with possible energy production, symbolized in this illustration by a turbo-compressor or turbine symbolized by vanes (41) and fixed to the transmission shaft to which a motor or generator (24) is connected, following which fluid is drawn off by the turbo-compressor or actuates a turbine, according to the applications. The fluid (71) is discharged through the tube (72).

The conical shape of the rotating annular chamber (44) enables the concentration of coarser solid particles to be favored in its wide part and finer particles in its narrow part. The flow rates and characteristics of the fluids injected through the tubes (5.1) and (5.2) may be adapted to the characteristics of the fluidized bed in the various zones.

Figure 12:
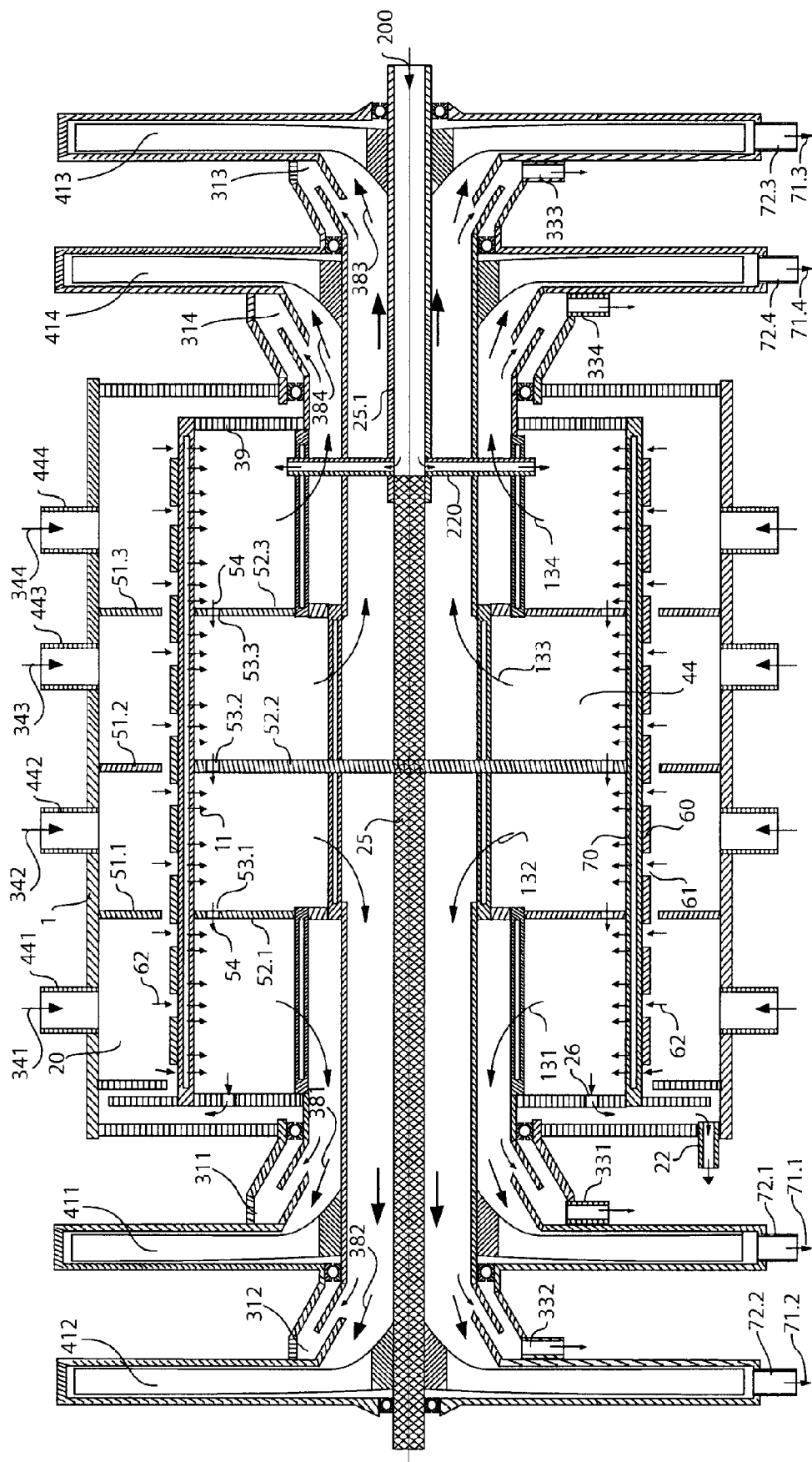
FIG. 12 shows the schematic longitudinal section of an example of an annular chamber divided into several sections traversed by fluids fed in and discharged separately, according to a particular embodiment of the present invention.

FIG. 12 shows the longitudinal section of a rotating reactor of the type of FIG. 11 according to a particular embodiment, with 4 feed zones separated by fixed annular partitions, (51.1) to (51.3), and 4 rotating annular zones separated by rotating partitions (52.1) to (52.3), provided with openings (53.1) to (53.4), enabling solid particles to pass (54) from one rotating annular zone to another.

The fluids (341) to (344) are fed separately through the tubes (441) to (444) and each passes through one of zones. These, (131) to (134), are discharged separately through separating chambers, (311) to (314) and discharge devices symbolized by turbines (411) to (414) through the tubes (72.1) to (72.4).

Solid particles (200) are fed from one side through the hollow transmission shaft (25.1) through the rotating tubes (220) and are discharged at the other side through openings (26) through the tube (22). The finer solid particles that are entrained by fluids, (131) to (134), are recovered in the separating chambers or cyclones, (311) to (314) through the tubes (331) to (334). The fluids (381) to (384), freed from their solid particles, are discharged through fluid-discharge devices, symbolized in this illustration by turbo-compressors or turbines symbolized by the vanes (411) to (414). The fluids (71.1) to (71.4) are discharged through the tubes (72.1) to (72.4).

One of the advantages of tangential injection of jets or thin layers of fluid, causing the fluidized bed to slide in the direction contrary to the rotational movement of the annular chamber, is to expose it successively to high expansion downstream from the fluid-injection openings, followed by contraction upstream from the following ejector, which is favorable to mass and heat transfers between the fluid and solid particles, especially when they are porous, and makes it possible to counteract cohesive forces. This device is therefore particularly well suited to methods involving porous solid particles or those tending to agglomerate and/or those requiring high mass or heat transfers, for example for very exothermic or endothermic reactions.

The devices according to the present invention are particularly suited to catalytic polymerization methods, including that for olefins, drying, extraction of volatile compounds, impregnation, coating, gasification, partial or total combustion, classification or other treatments of solid particles in suspension in a rotating fluidized bed, and catalytic conversion of fluids.

They are particular suited to the catalytic polymerization of olefins in the gaseous phase, in which at least part of the olefins is 1-octene.

The devices according to the invention are also applicable to the catalytic dehydrogenation of ethylbenzene for conversion into styrene.

They are also suitable for methods that comprise steps consisting of injecting a liquid onto said solid particles and of chemically or physically reacting (for example: drying, impregnation) said liquid impregnating or surrounding said particles with said gaseous fluid or fluids passing through said rotating fluidized bed.

Finally, they find applications in the agricultural field, for the treatment, in particular drying, of grain, powder, and other fragments of agricultural origin.

The present invention thus relates to a method chosen from catalytic polymerization methods including those for olefins, drying, extraction of volatile compounds, impregnation, coating, combustion, gasification, classification and other treatments of solid particles in suspension in a rotating fluidized bed, and catalytic conversion of fluids, characterized in that it uses the device according to the present invention.

According to a particular embodiment, the method consists of catalytic polymerization of olefins in the gaseous phase, characterized in that at least part of the olefins is 1-octene. According to a particular embodiment, the method comprises steps that consist of injecting a fluid onto said solid particles and chemically or physically reacting said fluid impregnating or surrounding said particles with said gaseous fluids passing through said rotating fluidized bed.

According to a particular embodiment, said fluid or mixture of fluids contains ethylbenzene and said catalytic conversion involves dehydrogenation in order to convert it into styrene.

According to a particular embodiment, said solid particles are of agricultural origin and chosen from grain, powder and other fragments.

Examples of Applications

Fluidization of Micro-Particles

Simulations have shown that it is possible to obtain a dense fluidized bed with particles of 15 micrometers, of group C of the Geldart classifications, by means of a very high centrifugal force, of the order of 50 times gravity, by causing them to pass through a fluid with a density comparable to air at a radial speed of the order of 0.4 m/s, and that particles of a few micrometers may be fluidized and form a dense fluidized bed with a centrifugal force 10 times higher.

In this example, the cylindrical reaction chamber has a diameter of 40 cm and is 1 m long. It comprises a central rotating tube for discharging fluid that is 28 cm in diameter, provided with vanes rotating at 6,000 revolutions per minutes, enabling fluid to be entrained around the rotating tube at a speed of approximately 85 m/s, generating a centrifugal force of more than 5,000 times gravity, sufficient to prevent the entrainment of solid particles, of an order of magnitude of 1 micrometer, in the discharge openings of the rotating tube.

Gas injectors, distributed about the cylindrical wall, enable gas to be injected in successive layers in transverse directions forming an angle of less than 45° with the circular wall. With a total injection area of $dm^2$, and a gas injection speed of 100 m/s, which gives a gas flow rate of 1 $m^3$/s, the average radial speed is approximately 0.4 m/s. The solid particles are entrained in a rapidly rotating movement that can generate a centrifugal force of more than 500 times gravity, sufficient to separate solid particles and to obtain a dense fluidized bed of a few cm thick with solid particles of 5 to 10 micrometers.

If the circular wall supporting the fluidized bed rotates at 600 revolutions a minute, which gives it a tangential speed of approximately 12 m/s, the centrifugal force generated by this rotational speed along this wall is 64 times gravity. This may be increased by injecting at least part of the gas in a tangential direction.

If the circular wall supporting the fluidized bed is fixed, the speed of rotation of solid particles along this wall will be lower, which makes it possible to fluidize larger-sized particles along this wall. This centrifugal force depends on the transfer of kinetic moment between these particles and particles close to the central rotating tube as well as the speed of fluid injection and other characteristics of the circular chamber. This therefore makes it possible to choose the size of the centrifugal force along the circular wall according to the particle size distribution of the solid particles that are to be fluidized.

This device therefore makes it possible, in an approximately 100 liter reactor, to cause a dense rotating fluidized bed of around fifty liters of solid particles to pass through with 1,000 liters of gas per second, and the centrifugal force gradient between the fluidized bed and the central rotating tube makes it possible to fluidize a mixture of solid particles containing fines of less than one micron. This is particularly valuable when the size of solid particles varies, for example by reason of their partial combustion for the production of synthesis gas, or of their progressive polymerization or coating.

Combustion or Gasification of Biomasses or Other Carbonaceous Particles.

A reactor of the type of FIG. 2 with a conical annular chamber (44) and a fluid-feed chamber (20) divided into annular sections fed separately with fluids through the tubes (5.1) and (5.2) as in FIG. 11 and having hollow blades (7) and provided with fluid injectors (12) as in FIG. 4, is well suited to the combustion or gasification of small particles of variable sizes such as coal dust or light particles that can burn rapidly, such as ground biomasses.

Solid particles fed through the tubes (21), of which the position may be adapted to the types of solid particles injected, are distributed inside the rotating annular chamber (44) or combustion chamber, the coarser preferably proceeding towards the wide part of the cone, which permits a longer dwell time. The high gas flow rate and possibly the temperature and composition of the gas injected in this zone through the tubes (5.2) may be adapted to the characteristics of the fluidized bed in this zone.

The particles with average sizes preferably accumulate in the narrow part of the combustion chamber, where they continue their combustion. Since the centrifugal force is higher in this zone and the thickness of the fluidized bed is smaller there, the gas flow in the tubes (5.1) should be adapted to the characteristics of the fluidized bed in this zone.

Finer particles accumulate along the blades (7) and are progressively entrained by fluid (13) inside the rotating discharge chamber (16) where they are accelerated by injecting fluid (12) and complete their combustion or gasification before being discharged through the tube (300).

Fine ash that has been entrained in the tube (300) may be recovered in the cyclone (31) through the tube (33). Fine ash that accumulates in the annular chamber (44) may be discharged intermittently through the tubes (22). Coarse ash may be recovered occasionally through a tube (22) placed at the wider end of the circular wall (2) where it has a tendency to accumulate but, generally, high turbulence normally prevents the formation of agglomerates and encourages their attrition which substantially reduces the volume thereof.

Since the gas flow can be extremely high and its dwell time very short, it is possible to use a very active gas, for example a mixture of pure oxygen and steam for the production of synthesis gas, or to use compressed air, the expansion of which through the turbine (70) may drive an alternator (75) for the direct production of electricity.

The heating value of this device depends substantially on the rate of combustion. The finer the solid particles fed in and the higher the gas pressure, the more rapid combustion will be, it being possible for the speed of rotation of the combustion chamber to be adapted to the characteristics of the solid particles fed in.

Polymerization of Fine Catalytic Particles

A device of the type of FIG. 2 with a conical annular chamber (44), as in FIG. 11, is perfectly suited to the polymerization of very active fine catalytic particles that are fed into the narrow part of the conical annular chamber and migrate towards the wide part as they progressively gain in weight and generally lose a little of their activity. They are then collected at the other end. They may possibly be recycled.

The fluid, which acts as a monomer, may be a liquid, on condition that it has its specific gravity less than that of the solid particles, but it is preferably in the gaseous state. It may be recycled by the compressor (41).

It is often desirable to put the catalytic particles in successive contact with fluids with different compositions and/or temperatures. In this case, the diagram of FIG. 5, that may adopt a conical shape in order to take account of the changes in size and activity of catalytic particles, is perfectly suitable. The catalytic particles are fed in from one side and collected at the other after having passed through 4 consecutive zones that are traversed by fluids that may be collected and recycled separately, for example by compressors placed on the same axis of rotation, (41.$a$) to (41.$d$).

Since gas flow rates may be extremely high, this method is particularly suited to the use of very fine and very active catalytic particles making it necessary to work at a low pressure.

Drying of a Mixture of Solid Particles

These schemes are suitable for drying mixtures of solid particles that are fed from one side of the rotating reactor and recovered at the other side, it being possible to separate fine particles from coarse particles, and the drying gas may be recycled, for example through compressors placed on the same axis of rotation, the cooler and dryer gas passing through the zone close to the outlet for dried solid particles and gases that are more charged with moisture and generally that are the hotter ones passing through the zone close to the inlet for solid particles to be dried.

This method also makes possible the extraction of solvents or other undesirable materials impregnating the solid particles to be treated.

Impregnation of Solid Particles

This same method enables solid particles to be impregnated, it being possible for the impregnation product to be contained in the fluid that passes through the fluidized bed or directly sprayed into the fluidized bed with the aid of spraying equipment fed through tubes passing through the inner circular wall (7), in the same way as the tubes (220) shown in FIGS. 7, 11 and 12 serving to feed in solid particles.

Catalytic Modification of a Fluid

This method is particularly suitable for the catalytic modification of a fluid requiring very short dwell times, with very active catalytic powders, requiring frequent regeneration of the catalyst.

If the fluid only has to pass through the fluidized bed once, the scheme of FIG. 1 or 7 is suitable. If it is to be recycled several times, for example in order to compensate for its cooling due to very endothermic reactions, such as the cracking of heavy petroleum olefins or the oxidoreduction of ethylbenzene into styrene, the scheme with several annular zones of FIG. 5 or 12 is preferable.

Polymerization and Copolymerization of Ethylene with Very Active Fine Catalytic Particles A reactor of the type of FIG. 5 or 12, containing several annular zones, enables the polymerization or copolymerization of ethylene to be better controlled, of which the reaction is very exothermic and very rapid with new very active catalysts.

Purely as an indication, so as to illustrate the orders of magnitude enabling the advantages of this latter type of reactor to be demonstrated, an industrial cylindrical reactor may be considered, of which the external and internal diameter of the rotating annular chamber is 3 and 1.8 m over a length of 5 m, or height if the axis of symmetry is vertical, and thus its volume is approximately 22 $m^3$ and its external surface area is approximately 47 $m^2$.

If this annular chamber rotates at 300 revolutions a minute, the tangential speed of the walls is approximately 47 and 28 m/s respectively, producing a centrifugal force 150 and 90 times gravity respectively. This latter value may be increased if the profile of the outlet openings enables solid particles close to the inner wall to rotate in the direction of rotation.

If this chamber is traversed by 120 $m^3$/s of ethylene at 4 bar, which is a sufficiently low pressure to enable it to be accompanied by a co-monomer comprising octene in the gaseous state, that is a little more than 2,000 tonnes an hour, the radial speed of the fluid of 2.5 m/s corresponds to an interstitial speed of approximately 5 m/s. It is normally insufficient for fluidizing solid particles of more than 100 microns subjected to a centrifugal force of 150 times gravity. If the gas flow rate is increased, there is a risk of entraining smaller solid particles in the central gas discharge chimney. On the other hand, if the flow rate is not increased, but if its injection in a contrary direction makes it possible to rotate the solid particles in a contrary direction to the speed of rotation at an average speed of approximately 20 m/s, that is a little more than 2 revolutions a second, the centrifugal force falls sufficiently in order to be able to fluidize coarse solid particles.

It is accordingly possible to maintain particles of approximately 30 microns inside the annular chamber while fluidizing particles of approximately 300 microns along the outer wall. (It should be noted that greater differences or higher flow rates may be obtained by increasing the speed of rotation and these values are purely indicative, since the actual behavior of solid particles should take account of their morphology).

With approximately spherical solid particles, it is normally possible to obtain a stable fluidized bed inside the annular chamber of an average concentration of 25%, that is approximately 5 tonnes of polyethylene corresponding to a dense fluidized bed, with an average concentration of 45% over a thickness of approximately 45%. The fall in pressure of the fluid through the fluidized bed under these conditions is approximately 1 bar, which the fall in pressure should be added through the fluid injectors, outlet openings of the inner annular wall and all the recovery circuits, for cooling and recycling fluid, which is of the same order of magnitude.

The annular chamber described in FIG. 12 having 4 successive annular zones, 4 compressors are necessary enabling the fluid discharged to be recompressed to 4 bar in order to recycle it. In order to be able to regulate the speed of rotation of the annular chamber independently of the speed of rotation of the compressors, it is preferable to install these compressors beside the reactor instead of being on the same axis of rotation.

Since each circuit for recycling the fluid is independent, it is possible to feed each zone at different temperatures and possibly compositions.

The transfer (54) of solid particles from one zone to another through the openings (53.1) to (53.4) is determined by differences of pressure from one zone to the other. This is influenced by the quantity of solid particles inside each zone and the quantity of fresh monomer or co-monomer that is added or the recycled fluid that is extracted in each recycling circuit. It is therefore possible to ensure regular transfer of solid particles from one zone to another by adjusting these extractions according to the pressures measured inside the various zones.

Solid particles suspended in the rotating fluidized bed are subjected to periodic variations of speed and pressure, at a frequency of approximately 100 revolutions per second, if the distance between the fluid injection openings is approximately 20 cm, which ensures very good heat transfer between the gas and the generally porous particles, which makes it possible to discharge heat of polymerization of 20 tonnes per hour, which increases the temperature of the gas by a little less than 30° C. centigrade, nearly all being compensated for by its cooling generated by its expansion through the fluidized bed. This makes it possible to have relatively constant temperature conditions inside each annular zone.

At a polymerization rhythm of 25 t/h, the dwell time of solid particles is on average 12 minutes during which their size will increase for example from 25 to 250 microns. If catalytic particles are introduced from one side and discharged from the other side, the average size of the solid particles inside each annular zone will develop progressively. The kinetic conditions of the gas and of the fluidized bed inside each zone are determined by the dimensions of the fluid injection and discharge openings in these zones. They may thus be fixed according to the average development of particle size distribution of the fluidized bed from one zone to another.

Since gas flows may be extremely high, this method is particularly suited for the use of very active small catalytic particles making it necessary to work at a low pressure.

As a comparison, a reactor of the same capacity with a conventional fluidized bed generally has a volume 5 times greater and works at pressures 10 times higher, which does not enable octene to be used in a gaseous state and which increases its construction cost and the industrial risk in case of an accident. It requires the injection of a neutral gas, generally in liquid form, to improve cooling and to reduce the rate of reaction, which increases cost of using it. The average dwell time of particles of polyethylene is generally more than one hour which increases the cost of transitions between the production of different qualities.

The invention claimed is:

1. A rotating fluidized bed vessel comprising:
at least one feed port for feeding at least one gaseous or liquid fluid into a circular chamber, disposed around the outer circular wall of said circular chamber and at least one discharge port enabling the said fluid to be discharged centrally,
at least one solid particle feed port for feeding solid particles into said circular chamber and at least one solid particle discharge port for discharging said solid particles, characterized in that:
said at least one feed port for feeding the said fluid comprises openings for injecting fluid, passing through said outer circular wall enabling said fluid to be injected in a direction of which the main component is tangential to said circular wall,
said at least one discharge port for discharging said fluid comprises a central rotating tube passing through or entering longitudinally inside said circular chamber, said central rotating tube having at least one discharge opening passing through the wall of said central tube enabling said fluid to be discharged centrally from said circular chamber, through said central rotating tube;
wherein the central rotating tube comprises blades which enable the layer of fluid to be entrained in a rotating movement about said central rotating tube.

2. The vessel of claim 1, characterized in that the outer circular wall of said circular chamber can rotate in the same direction and at a speed of rotation slower than the speed of rotation of said central rotating tube.

3. The vessel of claim 1, characterized in that the outer circular wall of said circular chamber is fixed to the said central rotating tube, in this way delimiting a rotating annular chamber and in that the fluid-injection openings passing through said outer circular wall are oriented in a direction opposite to the direction of rotation of the outer circular wall and of the central rotating tube.

4. The vessel of claim 1, characterized in that at least one of said blades is hollow and may be fed with fluid through a central tube that can serve as a transmission shaft and in that said hollow blade comprises at least one opening enabling said fluid to be injected in the direction of rotation.

5. The vessel of claim 1, characterized in that said discharge openings are delimited by blades wherein the distance separating the outer end of said blade from the following blade is less than the distance between said outer end and said outer circular wall.

6. The vessel of claim 1, characterized in that it includes a fixed feeding chamber inside which said circular chamber is located and in that said circular chamber is divided into at least two annular zones that are feedable with fluid separately.

7. The vessel of claim 1, characterized in that said central rotating tube is divided into at least two zones connected to separate at least one discharge port for discharging fluids.

8. The vessel of claim 7, characterized in that said at least one discharge port for discharging said fluids having said central rotating tube provided with said blades also has at least one fixed tube concentric with and outside said rotating tube, passing through at least one said annular section of said circular chamber and provided with at least one opening enabling said fluid coming from said annular section to be discharged centrally and separately, said blades fixed to said central rotating tube being extended so as to be able to rotate around and outside at least part of said fixed tube, in this way enabling the layer of fluids surrounding said fixed tube to rotate.

9. The vessel of claim 7, characterized in that it includes at least one annular disc fixed onto said central rotating tube, making it possible to separate said fluids that pass through said rotating fluidized bed and enter from either side of the annular disc in said at least two zones of said central rotating tube.

10. The vessel of claim 1, characterized in that said at least one solid particle feed port for feeding and for discharging said solid particles are chosen from:
- at least one solid particle feed port enabling the feeding of said solid particles from one side of said circular chamber and at least one solid particle discharge port enabling the discharging of said solid particles at the other end of said circular chamber,
- at least one solid particle feed port enabling the feeding of said solid particles into the central part of said circular chamber and at least one solid particle discharge port enabling the discharging of said solid particles at both ends of said circular chamber, and
- at least one solid particle feed port enabling the feeding of said solid particles at both ends of said circular chamber and at least one solid particle discharge port enabling the discharging of said solid particles at the center of said circular chamber.

11. The vessel of claim 1, characterized in that it includes at least one element enabling said solid particles to be moved longitudinally, chosen from:
- deflectors, helical coils and fractions of helical coils fixed along said circular wall,
- deflectors, helical coils and fractions of helical coils fixed along said central rotating tube, and
- the fluid injection openings enabling a fluid to be injected in a direction having a longitudinal component.

12. The vessel of claim 1, characterized in that said at least one fluid is a gas and in that it includes at least one feed port for injecting a liquid chosen from:
- at least one feed enabling said liquid to be injected onto at least part of the surface of said fluidized bed, and
- at least one feed port enabling the injection of said liquid inside said central rotating tube.

13. The vessel of claim 1, characterized in that the diameter of said central rotating tube is maximum of said side or sides through which said at least one fluid may be discharged from said central rotating tube.

14. The vessel of claim 1, characterized in that it includes at least one regulating ring fixed along said circular wall, the internal diameter of said regulating ring being greater than the diameter of the desired surface area of the fluidized bed.

15. A method for the transformation of solid particules in a vessel with a rotating fluidized bed according to claim 1 chosen from methods of catalytic polymerization including the polymerization of olefins, combustion, gasification, impregnation, coating, drying or other treatments of solid particules in suspension in a fluidized bed, characterized in that it includes steps that consist of injecting at least one fluid into a circular chamber containing said solid particles through said fluid-injection openings of the outer circular wall, and of discharging said at least one fluid centrally from said circular chamber into a central rotating tube through at least one discharge opening.

16. The method of claim 15, characterized in that the at least one fluid is gaseous and in that it comprises the steps that consist of spraying a liquid in fine droplets onto said solid particles and of reacting said liquid impregnating said particles with said gaseous fluid passing through said rotating fluidized bed.

17. Method for the catalytic transformation of fluids in a vessel with a fluidized bed according to claim 1, characterized in that it comprises the steps which consist in injecting at least one fluid in a circular chamber containing said solid particucules passing through the said fluid-injection openinings of the outer circular wall and in discharging said at least one fluid centrally from the said circular chamber into a central rotating tube through at least one discharge opening.

18. The method of claim 17, characterized in that the at least one fluid is gaseous and in that it comprises the steps that consist of spraying a liquid in fine droplets onto said solid particles and of reacting said liquid impregnating said particles with said gaseous fluid passing through said rotating fluidized bed.

19. A process comprising the reactor of claim 1 wherein said process is selected from the group consisting of polymerization, impregnation, coating, drying, extraction of volatile components, gasification, combustion of biomass and other carbonated solid particules, and the processes of catalytic transformation of fluids passing through the fluidized bed wherein the particles are catalysts.

* * * * *

UNITED STATES PATENT AND TRADEMARK OFFICE
CERTIFICATE OF CORRECTION

| | | |
|---|---|---|
| PATENT NO. | : 8,257,657 B2 | Page 1 of 1 |
| APPLICATION NO. | : 12/297991 | |
| DATED | : September 4, 2012 | |
| INVENTOR(S) | : Alex De Broqueville et al. | |

It is certified that error appears in the above-identified patent and that said Letters Patent is hereby corrected as shown below:

Column 1, Line 5, the paragraph should read "This patent application is the US National Stage under 35 USC 371 of Patent Cooperation Treaty (PCT) International Application No. PCT/EP2007/053941 having an International Filing Date of April 23, 2007, which claims priority on European Patent Application No. 06008351.6 filed April 21, 2006 and on European Patent Application No. 07103440.9 filed March 2, 2007".

Claim 12, Column 33, Line 31, the word --port--, should be inserted after the word "feed".

Signed and Sealed this
Sixth Day of November, 2012

David J. Kappos
*Director of the United States Patent and Trademark Office*